(12) United States Patent
Nishioka et al.

(10) Patent No.: US 7,468,944 B2
(45) Date of Patent: Dec. 23, 2008

(54) PATH FAULT RECOVERY METHOD, SWITCHING-BACK METHOD AFTER RECOVERY FROM FAULT, AND NODE USING THE SAME

(75) Inventors: Itaru Nishioka, Tokyo (JP); Yoshihiko Suemura, Tokyo (JP)

(73) Assignee: NEC Corporation, Tokyo (JP)

( * ) Notice: Subject to any disclaimer, the term of this patent is extended or adjusted under 35 U.S.C. 154(b) by 1075 days.

(21) Appl. No.: 10/347,786

(22) Filed: Jan. 22, 2003

(65) Prior Publication Data
US 2003/0137932 A1    Jul. 24, 2003

(30) Foreign Application Priority Data
Jan. 23, 2002  (JP) ............................... 2002-013626

(51) Int. Cl.
*G01R 31/08*   (2006.01)
*G06F 15/173*  (2006.01)

(52) U.S. Cl. ...................................... 370/225; 709/226
(58) Field of Classification Search ................ None
See application file for complete search history.

(56) References Cited

U.S. PATENT DOCUMENTS

| 2003/0023749 A1* | 1/2003 | Lee et al. ..................... 709/240 |
| 2003/0117951 A1* | 6/2003 | Weibe et al. ................. 370/225 |
| 2003/0169470 A1* | 9/2003 | Alagar et al. ............... 359/110 |
| 2003/0169692 A1* | 9/2003 | Stern et al. .................. 370/242 |
| 2003/0187934 A1* | 10/2003 | Nishikawa et al. .......... 709/206 |

FOREIGN PATENT DOCUMENTS

| JP | 2000-83042 A   | 3/2000 |
| JP | 2001-237877 A  | 8/2001 |
| JP | 2003-069521 A  | 3/2003 |

OTHER PUBLICATIONS

E. Mannie et al., "draft-ietf-ccam-gmls-architecture-01.txt", Generalized Multi-Protocol Label Switching (GMPLS) Architecture, (Nov. 2001), pp. 1-44.
B. Rajagopal et al., "draft-bala-protection-restoration-signaling-00.txt", Signaling for Protection and Restoration in Optical Mesh Networks, (May 14, 2002), pp. 1-14.

* cited by examiner

*Primary Examiner*—Firmin Backer
*Assistant Examiner*—Clemence Han
(74) *Attorney, Agent, or Firm*—Sughrue Mion, PLLC

(57) ABSTRACT

This invention provides an optical path fault recovery method by which an end point node of an active path having received fault notification issues a resource securing request message transferred hop by hop to a start point node along the standby path. In the case where resources of the standby path are secured, when the resources are used by the extra traffic, the nodes on the standby path and the start point node that have received the message release the extra traffic and then secure the resources. When the resource securing request message reaches the start point node, the start point node issues a switch changeover request message, and the end point node, the start point node, and the nodes on the standby path set switches according to the secured resources.

16 Claims, 17 Drawing Sheets

PATH FAULT RECOVERY METHOD, SWITCHING-BACK METHOD AFTER RECOVERY FROM FAULT, AND NODE USING THE SAME

BACKGROUND OF THE INVENTION

1. Field of the Invention

The present invention relates to a path fault recovery method, a switching-back method after recovery from a fault, and a node using the same, and particularly concerns a fault recovery method for an optical path using a signaling message in an optical network and a switching-back method for an optical path after recovery from a fault.

2. Description of the Prior Art

As to an optical network constituted by an OXC (Optical Cross-connect) and an ADM (Add/Drop Multiplexer) or a SONET/SDH XC (Synchronous Optical Network/Synchronous Digital Hierarchy Cross-connect), a conventional example of a fault recovery method in the event of a fault on an active path is described in "draft-ietf-ccamp-gmpls-architecture-01.txt" (hereinafter, referred to as Document 1) which is an Internet draft of IETF (Internet Engineering Task Force). The fault recovery method for switching an active path and a standby path in Document 1 is further classified as "1+1" method, "1:1" method, and "Shared" method.

The "1+1" method sets a standby path having a path not overlapping with an active path when the active path is set. In this method, data from a client is supplied to both of the active path and the standby path on the transmitting ends of the paths and only data from the active path is received on the receiving ends. Moreover, in this method, when the active path has a fault, switching is made to the standby path on the receiving ends to recover from a communication fault.

Meanwhile, in the "1:1" method and the "Shared" method, as with the "1+1" method, a standby path having a path not overlapping with an active path is set when the active path is set. These methods are different from the "1+1" method in that resources for the standby path are reserved but switches are not set when the standby path is set.

Hence, in the "1:1" method and the "Shared" method, when an active path does not have a fault, resources reserved for a standby path can be used by extra traffic to effectively use resources in a network. Here, the extra traffic indicates communicated traffic which is supposed to be removed when the active path has a fault.

In the "1:1" method and the "Shared" method, when an active path has a fault, a signaling message is used to secure resources of a standby path and to set switches. When setting of the standby path is completed, it is possible to recover from a communication fault by making switching from the active path to the standby path.

An example of specific steps of the above-described fault recovery method is described in "draft-bala-protection-restoration-signaling-00.txt" (hereinafter, referred to as Document 2), which is an Internet draft of IETF. According to Document 2, in the "1:1" method and the "Shared" method, in the event of a fault on an active path, a start point node transmits a switch changeover request message which is transferred hop by hop to nodes on the route of a standby path until an endpoint node. The node having received the message secures resources for the standby path and sets switches.

When the message reaches the end point node, the end point node transmits a confirmation message which is transferred hop by hop to the nodes on the route of the standby path until the start point node. The nodes having received the message confirm whether the switches are set properly. When the message reaches the start point node, the fault recovery is completed. Here, the resources indicate an OXC port requested for setting an optical path, a time slot in SONET/SDH, and so on.

In the fault recovery steps of the "1:1" method and the "Shared" method described in Document 2, when the resources of a standby path are used by extra traffic, an improper connection occurs in such a way that data of a path which is under recovering from a fault is transferred to a client of the extra traffic.

This is because when the switches of the standby path are set from the upstream side of the path and data transfer is started, the switches of nodes on the downstream side of the path are set on the route of extra traffic, and thus data is supplied along the route of the extra traffic.

Further, in the fault recovery method of the "1:1" method and the "Shared" method described in Document 2, when a plurality of paths is set in a fault section, some of the paths may not satisfy a requested fault recovery time.

This is because the order of fault recovery is not managed on each node and thus a fault recovery operation may be started from a path not requiring quick fault recovery, thereby delaying the start of a fault recovery operation for setting fault recovery of the other paths requiring quick fault recovery.

Moreover, in the fault recovery steps of the "1:1" method and the "Shared" method described in Document 2, when a plurality of faults occurs simultaneously, fault recovery may not be performed, resulting in insufficient reliability.

This is because failed setting may occur on the standby path due to multiple faults resulted from the standby path as well as the active path, failed transfer of a signaling message for setting the standby path, and so on.

Furthermore, Document 2 does not describe the step of switching-back from a standby path to an active path when the active path recovers from a fault.

BRIEF SUMMARY OF THE INVENTION

The present invention has as its object the provision of a path fault recovery method and nodes using the same whereby the above-described problems are solved, and when resources of a standby path are used by extra traffic, it is possible to quickly set the standby path and perform changeover from an active path to the standby path without causing an improper connection in the event of a fault on the active path.

Further, another object of the present invention is to provide a path fault recovery method and nodes using the same whereby when a fault occurs on an active path, in the case of failed setting of a standby path upon switching from the active path to the standby path, recovery can be performed with high reliability by using a backup fault recovery method.

Another object of the present invention is to provide a switching-back method after recovery from a fault and nodes using the same whereby switching-back can be performed from a standby path to an active path without cutting off communication between clients when the active path recovers from a fault.

A first path fault recovery method of the present invention, in which one of the extreme point nodes of an active path issues a resource securing request message and a switch changeover request message, the messages being transferred hop by hop to the other extreme point node along the route of a predetermined standby path, comprising the steps of:

releasing extra traffic upon reception of the resource securing request message, the extra traffic indicating communicated traffic which is supposed to be removed, securing resources reserved for the standby path after releasing the extra traffic, and setting switches of each node on the route of the standby path according to the secured resources upon reception of the switch changeover request message issued from the other extreme point node after the resources are secured for each node on the route of the standby path.

A second path fault recovery method of the present invention is a path fault recovery method for a communication network comprising a plurality of nodes, each including a control section for processing a control message and a switch for switching paths, a control channel for connecting the control sections of the plurality of nodes, and a link for connecting the switches of the plurality of nodes, characterized in that when an active path and a corresponding standby path are set in advance between a start point node and an end point node of the path, one of the extreme point nodes of the path having received fault notification of the active path issues a resource securing request message, extra traffic using the resources of the standby path is released and the resources of the standby path are secured until the other extreme point node, and then, the other extreme point node issues a switch changeover message to set the switch according to the secured resources.

A third path fault recovery method of the present invention is a path fault recovery method for a communication network comprising a plurality of nodes, each including a control section for processing a control message and a switch for switching paths, a network managing device for managing the overall network, a control channel for connecting the control sections of the plurality of nodes and the network managing device, and a link for connecting the switches of the plurality of nodes, characterized in that when an active path and a corresponding standby path are set in advance between a start point node and an end point node of the path, the network managing device issues a resource securing request message to each of the nodes on the route of the standby path upon reception of notification of a fault on the active path, the node having received the resource securing request message releases extra traffic using the resources of the standby path and secures the resources of the standby path, the network managing device issues a switch changeover message to each of the nodes on the route of the standby path, and the node having received the switch changeover message sets the switch according to the secured resources.

A fourth path fault recovery method of the present invention is a path fault recovery method for a communication network comprising a plurality of nodes, each including a switch for switching paths, a network managing device for managing the overall network, a control channel for connecting the switches of the plurality of nodes and the network managing device, and a link for connecting the switches of the plurality of nodes, characterized in that when an active path and a corresponding standby path are set in advance between a start point node and an end point node of the path, after the network managing device having received notification of a fault on the active path releases extra traffic using the resources of the standby path and secures the resources of the standby path, a switch changeover message is issued to each of the nodes on the route of the standby path, and the node having received the switch changeover message sets the switch according to the resources secured by the network managing device.

A fifth path fault recovery method of the present invention is a path fault recovery method for a communication network comprising a plurality of nodes, each including a control section for processing a control message and a switch for switching paths, a control channel for connecting the control sections of the plurality of nodes, and a link for connecting the switches of the plurality of nodes, characterized in that when an active path and a corresponding standby path are set in advance between a start point node and an end point node of the path, after changeover is performed to the standby path due to a fault on the active path, in the case where failed setting of the standby path is detected, a route from the start point node to the end point node is calculated except for a fault section, another substitute path is set along the route, and the active path is switched to the substitute path.

A switching-back method after recovery from a fault according to the present invention is a switching-back method after recovery from a fault for a communication network comprising a plurality of nodes, each including a control section for processing a control message and a switch for switching paths, a control channel for connecting the control sections of the plurality of nodes, and a link for connecting the switches of the plurality of nodes, characterized in that when a standby path is used due to a fault on an active path, one of the extreme point nodes of a path having received fault recovery notification of the active path transmits a fault recovery message to the other extreme point node, switching-back is performed from the standby path to the active path by exchanging a switching-back request message, a switching-back success message, and a switching-back completion message between the extreme point nodes of the path to perform changeover of the switches in the extreme point nodes, and then, the resources of the standby path are released and the switches are set at an unconnected state.

Nodes of the present invention are nodes using a path fault recovery method in which one of the extreme point nodes of a path having received notification of a fault on an active path issues a resource securing request message transferred hop by hop to the other extreme point node along the route of a predetermined standby path, the node comprising: means for releasing extra traffic upon reception of the resource securing request message, the extra traffic indicating communicated traffic which is supposed to be removed, means for securing resources reserved for the standby path after releasing the extra traffic, and means for setting switches according to the secured resources upon reception of a switch changeover request message issued after securing the resources.

Namely, according to the path fault recovery method of the present invention, an extreme point node of a path having received notification of a fault on an active path issues a resource securing request message transferred hop by hop to the opposite extreme point node along the route of a standby path. After extra traffic is released and resources reserved for the standby path are secured in the nodes on the route of the standby path having received the message, a switch changeover request message is issued and the nodes having received the message set the switches according to the secured resources. Thus, changeover can be performed from the active path to the standby path without an improper connection.

According to another path fault recovery method of the present invention, even when a standby path cannot be set due to a fault on the standby path, another substitute path is set on a route other than a fault section and an active path having a fault can be switched to the substitute path. Thus, recovery can be performed with high reliability.

According to a switching-back method after recovery from a fault of the present invention, when an active path recovers from a fault, the active path and a standby path in a bridging state are switched. Thus, switching-back can be performed from the used standby path to the active path without cutting off communication between clients.

DETAILED DESCRIPTION OF THE PREFERRED EMBODIMENTS

Figure 1:
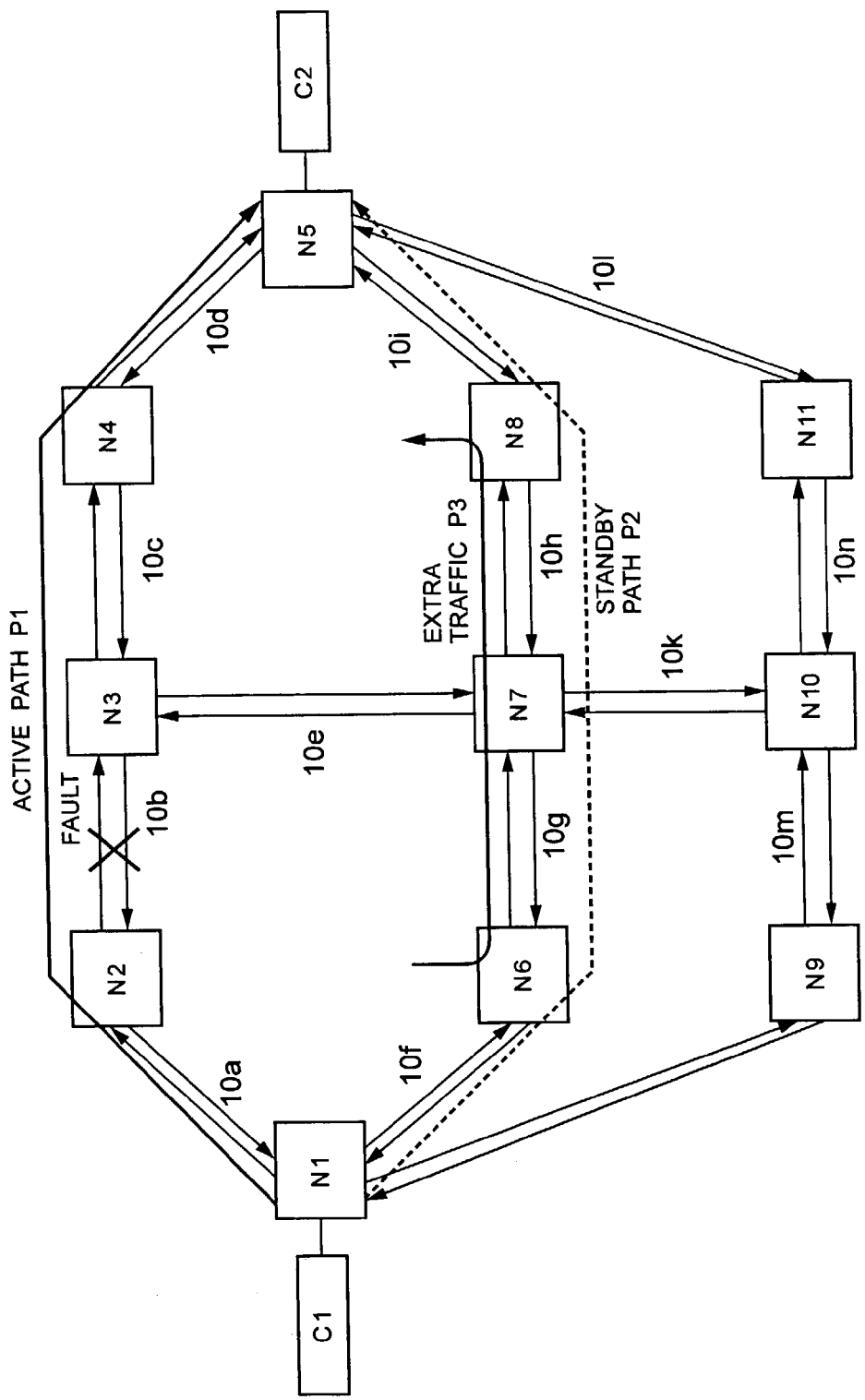
FIG. 1 is a block diagram showing a structural example of a network according to Example 1 of the present invention.

The following will discuss examples of the present invention in accordance with the accompanied drawings. FIG. 1 is a block diagram showing a structural example of a network according to Example 1 of the present invention. In FIG. 1, reference numerals N1 to N11 denote nodes which are connected via two optical fibers 10a to 10n in such a manner as to transfer signals bidirectionally.

Further, reference numerals C1 and C2 denote clients respectively connected to the nodes N1 and N5, and one or more similar clients are connected to the nodes N2 to N4 and N6 to N11 (not shown).

In the network according to Example 1 of the present invention, as paths connecting the clients C1 and C2, an active path P1 (N1-N2-N3-N4-N5) and a standby path P2 (N1-N6-N7-N8-N5) for the active path P1 are set in the network. Extra traffic P3 (N6-N7-N8) flows as resources allocated for the standby path. Here, the extra traffic P3 indicates communicated traffic which is supposed to be removed when the active path has a fault.

Figure 2:
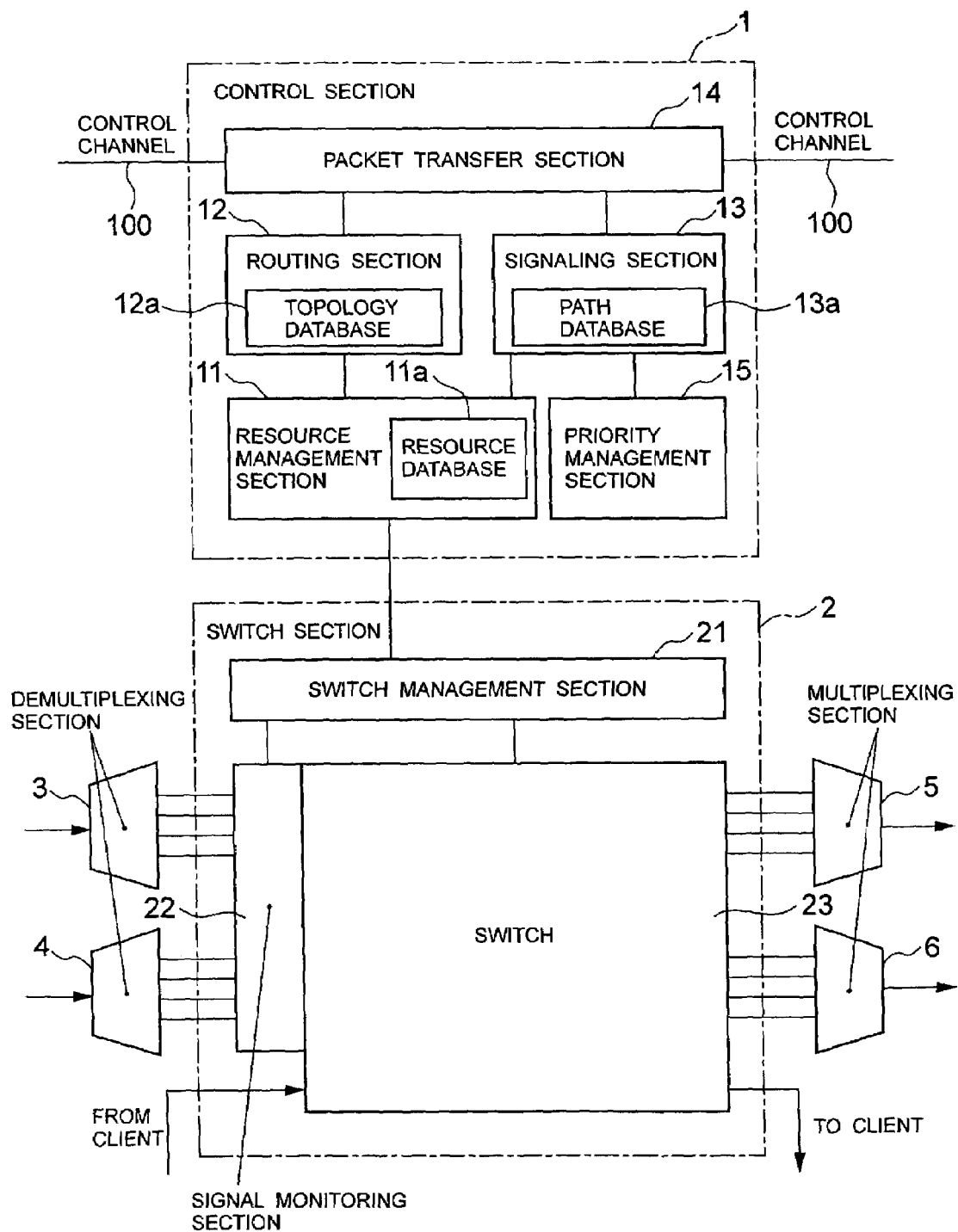
FIG. 2 is a block diagram showing a structural example of each node shown in FIG. 1.

FIG. 2 is a block diagram showing a structural example of each of the nodes N1 to N11 shown in FIG. 1. In FIG. 2, the nodes N1 to N11 are each constituted by a control section 1 and a switch section 2. The control section 1 is functionally constituted by a resource management section 11, a routing section 12, a signaling section 13, a packet transfer section 14, and a priority management section 15.

The resource management section 11 has the function of managing an attribute and vacancy information of the link of the nodes N1 to N11 based on a resource database 11a and transmitting a setting request of a switch 23 to a switch management section 21.

The routing section 12 has the function of retrieving an attribute and vacancy information of the link of the nodes from the resource management section 11 and transmitting these pieces of information to the other nodes via the packet transfer section 14, and the routing section 12 has the function of constructing a topology database 12a based on resource information received from the other nodes and calculating a route based on the database when a path is set.

The signaling section 13 has the function of transferring a message via the packet transfer section to adjacent nodes along a route for setting a path, and the signaling section 13 in each of the nodes N1 to N11 having received a message has the function of requesting the resource management section 11 to reserve a resource called a label according to an attribute of a requested path.

The packet transfer section 14 is connected to the packet transfer section of an adjacent node via a control channel 100. The priority management section 15 manages the priority of paths to be recovered from a fault. In the event of a fault, when a plurality of paths needs to be recovered from a fault, the signaling section 13 starts fault recovery from a path with a higher priority managed by the priority management section 15.

The switch section 2 is constituted by a switch management section 21, a signal monitoring section 22, and a switch 23. Demultiplexing sections 3 and 4 are placed on the previous stage and multiplexing sections 5 and 6 are placed on the subsequent stage.

The switch management section 21 has the function of setting the switch 23 in response to a request from the resource management section 11, and the signal monitoring section 22 has the function of notifying the resource management section 11 of fault information via the switch management section 21 when a fault is detected on a path.

Figure 3:
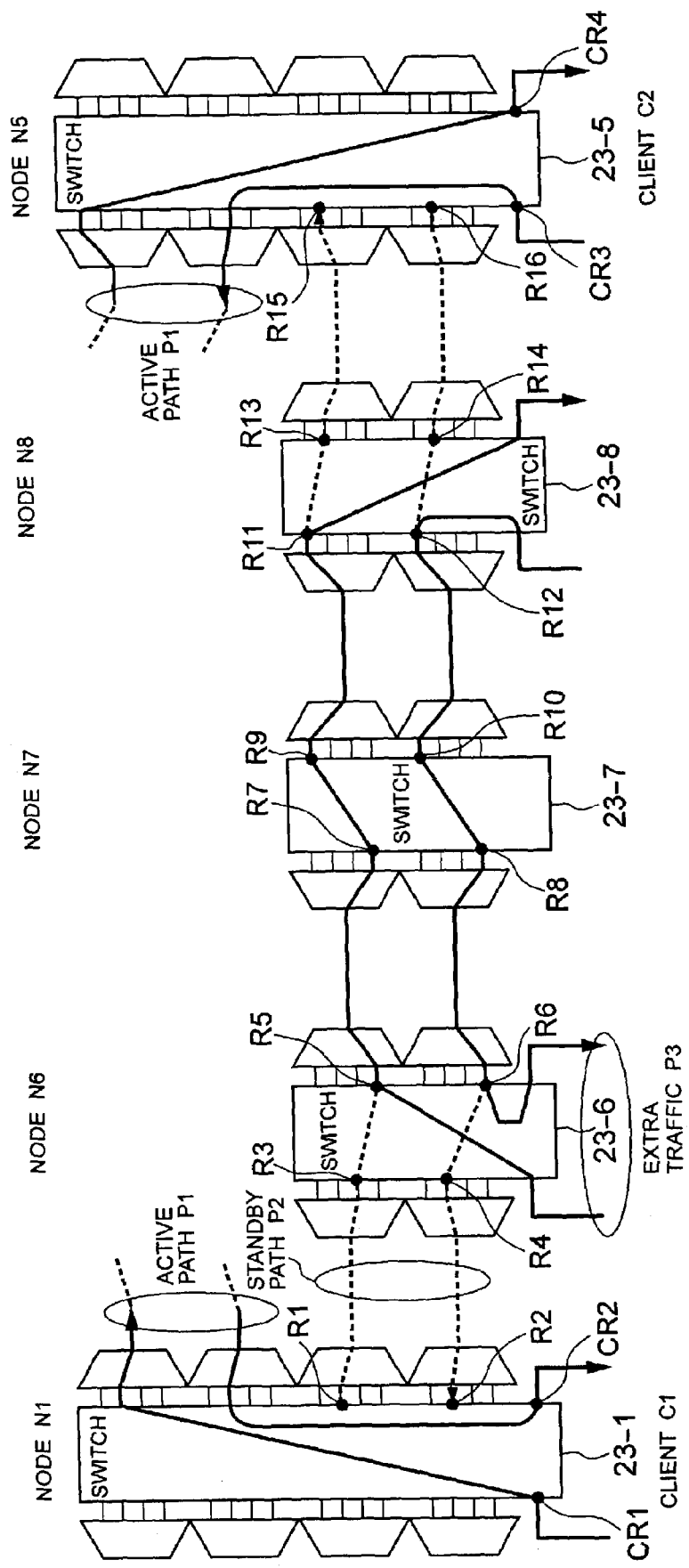
FIG. 3 is a diagram showing a route of a standby path in the network according to Example 1 of the present invention.
Figure 4:
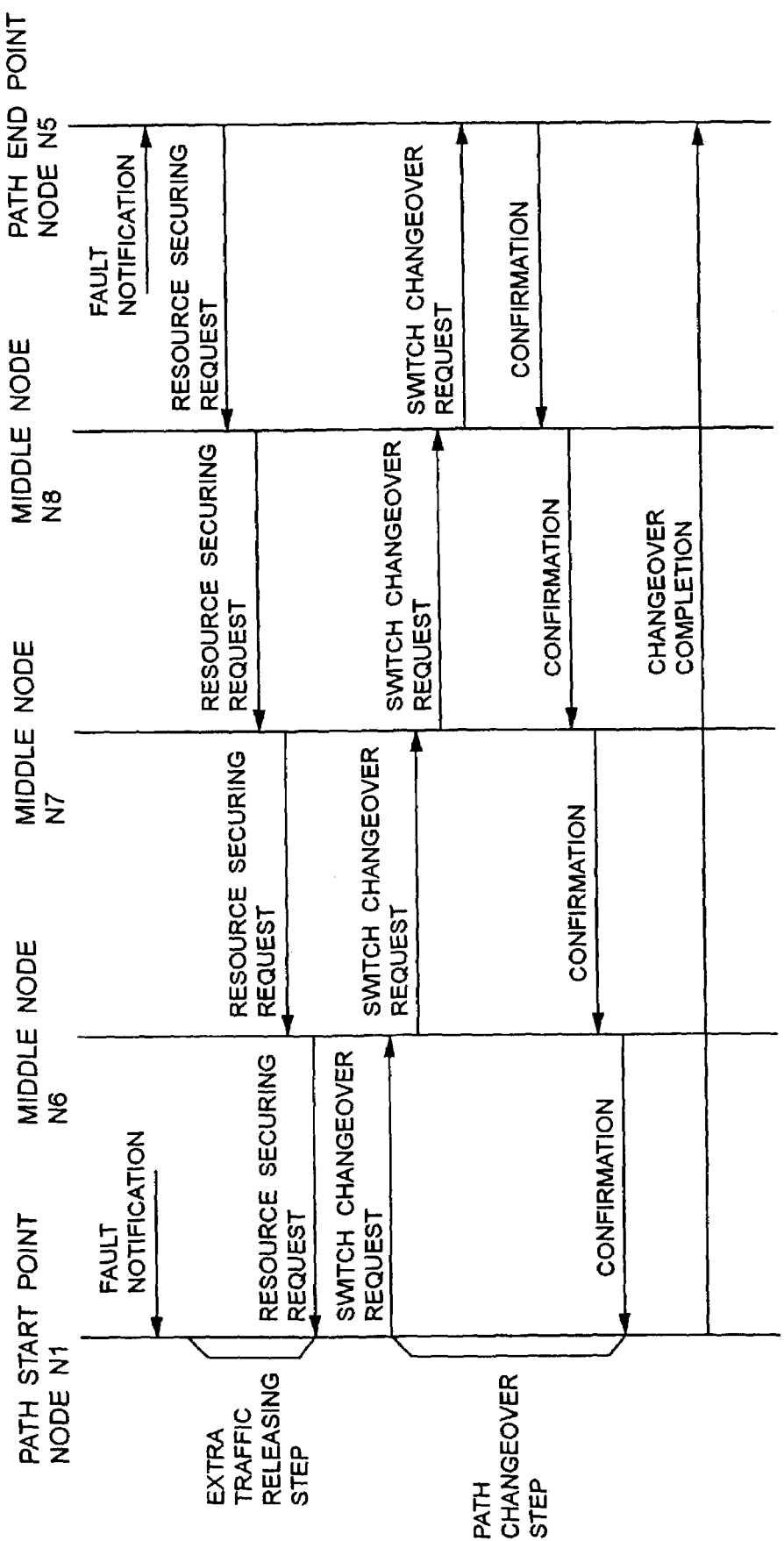
FIG. 4 is a sequence chart showing operations of a fault recovery method according to Example 1 of the present invention.

FIG. 3 is a diagram showing a route of the standby path in the network according to Example 1 of the present invention. FIG. 4 is a sequence chart showing the operations of the fault recovery method according to Example 1 of the present invention. Referring to FIGS. 1 to 4, the following will discuss a fault recovery operation when a fault occurs on the optical fiber 10b where the two-way active path is set.

First, the following will discuss a notifying method when a fault occurs on the optical fiber 10b. When a fault occurs on the optical fiber 10b on the two-way active path P1, each of the signal monitoring sections 22 of the node N2 and the node N3 detects a fault of the active path P1, and the fault information is notified along the active path P1 to the start point node N1 and the end point node N5 of the active path P1 by using AIS (Alarm Indicator Signal) of SONET/SDH or a signaling message.

When AIS of SONET/SDH is used, in the node N2 and the node N3 having detected a fault, the signal monitoring section 22 describes fault information on an overhead of a SONET/SDH frame of the active path P1 and sequentially transfers fault information to the node N1 on the upstream side and the node N4 and the node N5 on the downstream side. Finally, when the notification of the fault reaches the signal monitoring section 22 in the node N1 and the node N5, the fault is notified to the resource management section 11 via the switch management section 21.

The resource management section 11 searches a path ID (identification information) of the active path P1 from the resource database 11a based on resource information used for the active path P1, and notifies the signaling section 13 of the path ID together with the fault information. In response to the notification, the signaling section 13 of the node N5 starts a fault recovery operation.

Meanwhile, when a signaling message is used, the signal monitoring section 22 in the node N2 and the node N3 having detected a fault notifies the resource management section 11 via the switch management section 21 that the active path P1 has a fault. In response, the resource management section 11 searches a path ID of the active path P1 from the resource database 11a based on resource information used by the active path P1, and notifies the signaling section 13 of the path ID.

The signaling section 13 searches the addresses of the start point node N1 and the end point node N5 of the active path P1 based on the path ID and transmits a message including the path ID and the fault information to the node N1 and the node N5 via the control channel 100 from the packet transfer section 14. When the signaling section 13 in the node N5 receives the message, the fault recovery operation is started.

When the signaling section 13 in the node N5 receives notification about faults detected on a plurality of paths, the signaling section 13 inquires the priority management section 15 and determines the order of the paths to be recovered from the faults according to the priority. Thereafter, the fault recovery operation is started in accordance with the priority order. For example, as fault recovery methods used for paths, "1+1" method, "1:1" method, and "Shared" method are higher in priority in this order. In the case of the same fault recovery method, paths with longer hop lengths are higher in priority.

Figure 5:
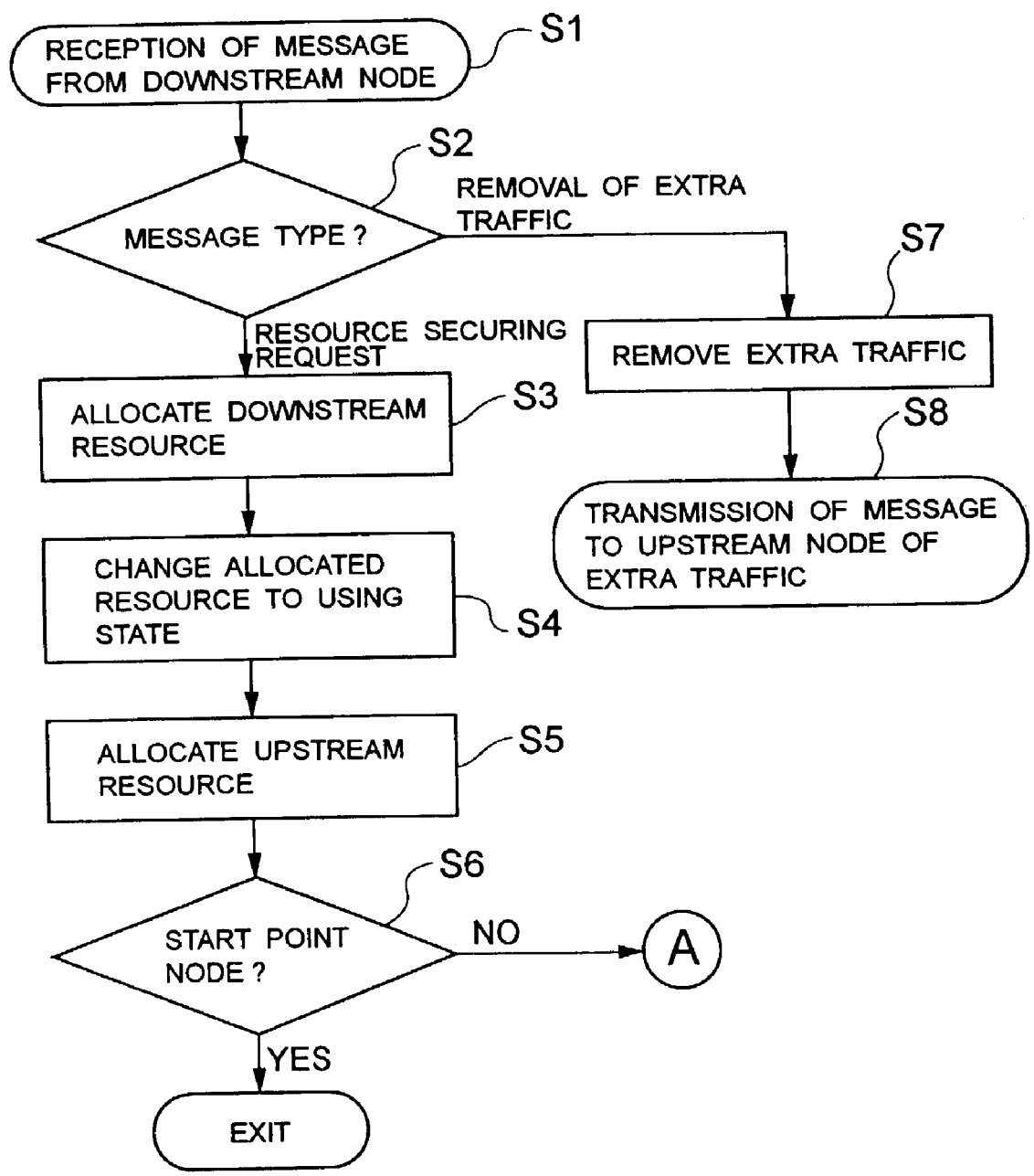
FIG. 5 is a flowchart showing the steps of securing resources according to Example 1 of the present invention.
Figure 6:
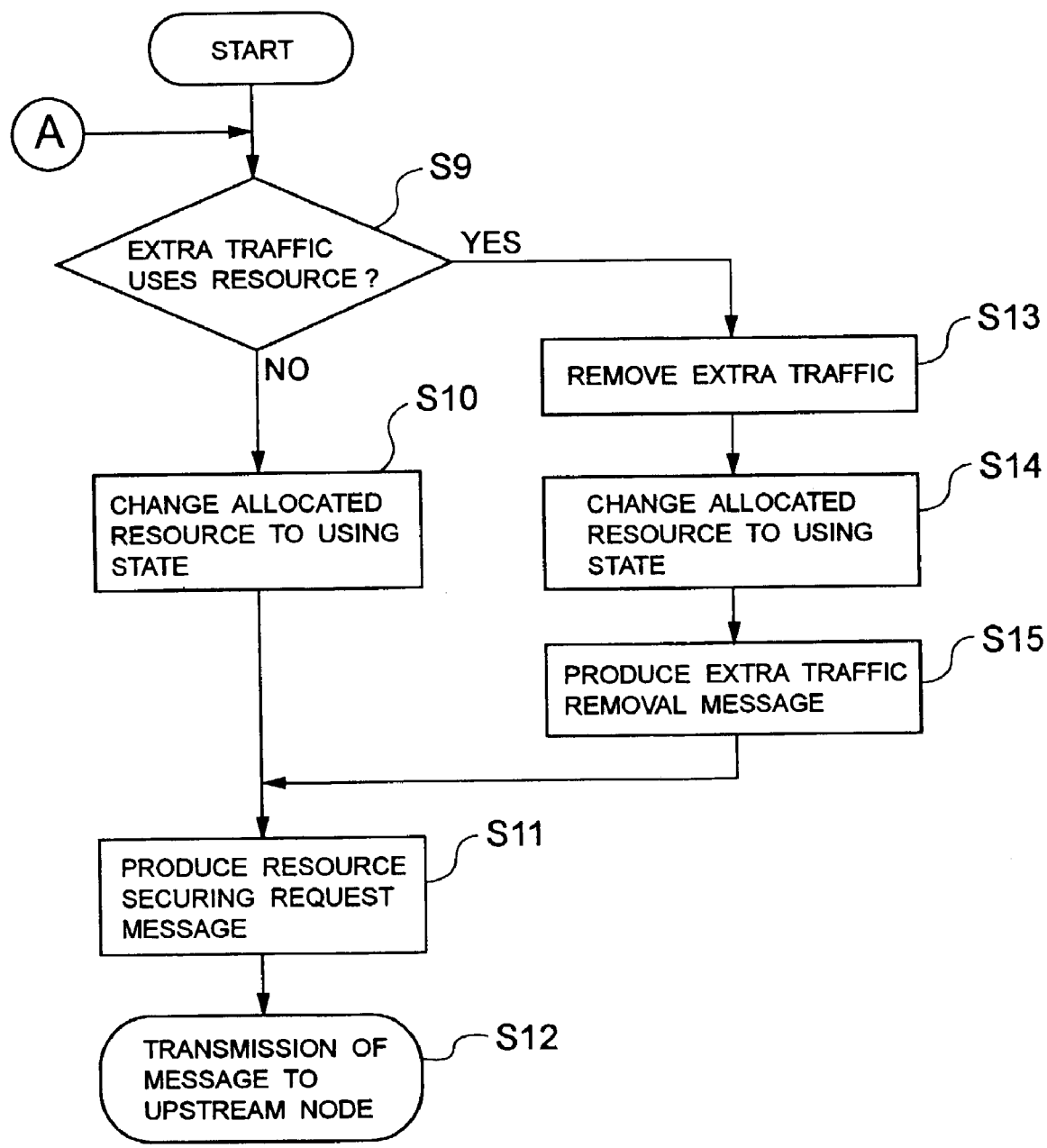
FIG. 6 is a flowchart showing the steps of securing resources according to Example 1 of the present invention.

FIGS. 5 and 6 are flowcharts showing the steps of securing resources according to Example 1 of the present invention. Referring to FIGS. 3 to 6, the following will discuss the step of releasing the extra traffic P3 set on the standby path and allocating resources to the standby path P2 (resource securing step) after the signaling section 13 of the node N5 receives fault notification according to the above-described methods, and the step of setting switches of the standby path P2 (path switching step). First, the resource securing step will be described in accordance with FIGS. 5 and 6.

When fault notification is received which includes a path ID of the active path P1 having a fault, the signaling section 13 inquires the resource management section 11 on whether resources R15 and R16 secured for the standby path P2 are available or not (Step S9, FIG. 6). Since the resources R15 and R16 are not used for the extra traffic P3 in the node N5, the resource management section 11 changes the use states of the resources R15 and R16 of the resource database 11a to in-use and notifies the signaling section 13 of the allocation of the resources R15 and R16 (Step S10, FIG. 6). When the resources are successfully allocated, the signaling section 13 produces a resource securing request message (step S11, FIG. 6) including the path ID and allocated resource numbers (R15, R16) and transmits the message to an adjacent node N8 on the upstream side (Step S12, FIG. 6).

When the node N8 receives the message (Step S2, FIG. 5), the resource management section 11 allocates resources R13 and R14, which correspond to the resource numbers of the message, to the standby path P2 (Step S3, FIG. 5).

Next, the resource management section 11 allocates resources R11 and R12 on the upstream side (Step S5, FIG. 5). Since the extra traffic P3 is used when the resources R11 and R12 are allocated (Step S9, FIG. 6), it is necessary to firstly remove the extra traffic P3.

When the extra traffic P3 is removed, the resources R11 and R12 used by the extra traffic are released and the states of the resources R11 and R12 in the resource database 11a are changed to reserving states. Then, notification is sent to the switch management section 21 to set a switch 23-8 in a state in which the resources are not connected to anywhere (unconnected) (Step S13, FIG. 6).

When notification about completion of setting is received from the switch management section 21 and the removal of the extra traffic P3 is completed, the resource management section 11 allocates these resources to the standby path P2 and the states of the resources R11 and R12 are changed to in-use (Step S14, FIG. 6).

Subsequently, the resource management section 11 notifies the signaling section 13 that the extra traffic P3 is released, the resources R13 and R14 are allocated as downstream resources of the standby path P2, and the resources R11 and R12 are allocated as upstream resources of the standby path P2. The signaling section 13 having received the notification produces an extra traffic removal message including the path ID of the extra traffic P3 and a resource securing request message including the path ID of the standby path P2 and the upstream resource numbers (R11, R12) (Step S15, FIG. 6), and the two messages are transmitted to an adjacent node N7 on the upstream side in the order of the extra traffic removal message and the resource securing request message (Step S12, FIG. 6).

When the node N7 receives the two messages, the extra traffic removal message received first is processed (Steps S7 and S8, FIG. 5). Then, the resource securing request message is processed (Step S3 and later, FIG. 5). The above-described processing is performed on the nodes until the start point node N1 of the standby path P2, so that the extra traffic P3 is released and the resources are allocated to the standby path P2.

Next, the steps of switching paths will be discussed. When the extra traffic P3 is released and the resources are allocated to the standby path P2, the signaling section 13 in the start point node N1 of the standby path P2 requests the resource management section 11 to perform changeover of the switches, simultaneously produces a switch changeover request message including a path ID of the standby path P2, and transmits the message to an adjacent node N6.

The resource management section 11 having received the switch changeover request in the node N1 sets a switch 23-1 via the switch management section 21 so as to connect resources R1 and R2 allocated in the step of releasing the extra traffic and resources CR1 and CR2 connected to a client. When the changeover of the switch 23-1 is completed, the switch management section 21 notifies the signaling section 13 that the changeover of the switch is completed.

Meanwhile, the signaling section 13 in the node N6 having received the switch changeover request message similarly requests the resource management section 11 to perform changeover of switches. At the same time, the signaling section 13 produces a switch changeover request message including a path ID of the standby path P2 and transmits the message to an adjacent node N7. The resource management section 11 having received the switch changeover request in the node N6 sets a switch 23-6 via the switch management section 21 so as to connect resources (R3, R5) and (R4, R6) allocated in the step of releasing the extra traffic.

Hereinafter, in the same steps, when setting of the switches 23 of the nodes are completed until that of the end point node N5 of the path, changeover from the active path P1 to the standby path P2 is completed and communication between the clients C1 and C2 can be restarted.

However, since a message is transmitted to a subsequent node before completion of changeover of the switches 23-1 and 23-5 to 23-8 in the nodes, an improper connection and failed changeover may occur on the switches 23-1 and 23-5 to 23-8 in the nodes. Thus, the signaling section 13 in the end point node N5 of the standby path P2 produces a confirmation message in response to notification about completion of changeover from the resource management section 11, and the signaling section 13 transmits the message to an adjacent node N8. The signaling section 13 in the node N8 having received the confirmation message confirms that the changeover of the switch 23 is normally performed, and the signaling section 13 transmits the similar confirmation message to a subsequent node. This step is performed in each of the nodes of the standby path P2. When the signaling section 13 in the start point node N1 of the standby path P2 finally confirms normal changeover of switches, a switching completion message is produced and transmitted to the end point node N5 of the standby path P2. When the node N5 receives the message, the fault recovery operation is completed.

In the fault recovery method according to the present example, the extra traffic P3 is released and the resources are reserved simultaneously. Thus, it is possible to positively set the standby path P2 without allowing the extra traffic P3 in the other settings to take the resources.

Further, after the changeover of the switches, the confirmation message prevents an improper connection and failed connection of the switches 23-1 and 23-5 to 23-8, thereby achieving a fault recovery method with high reliability.

Figure 7:
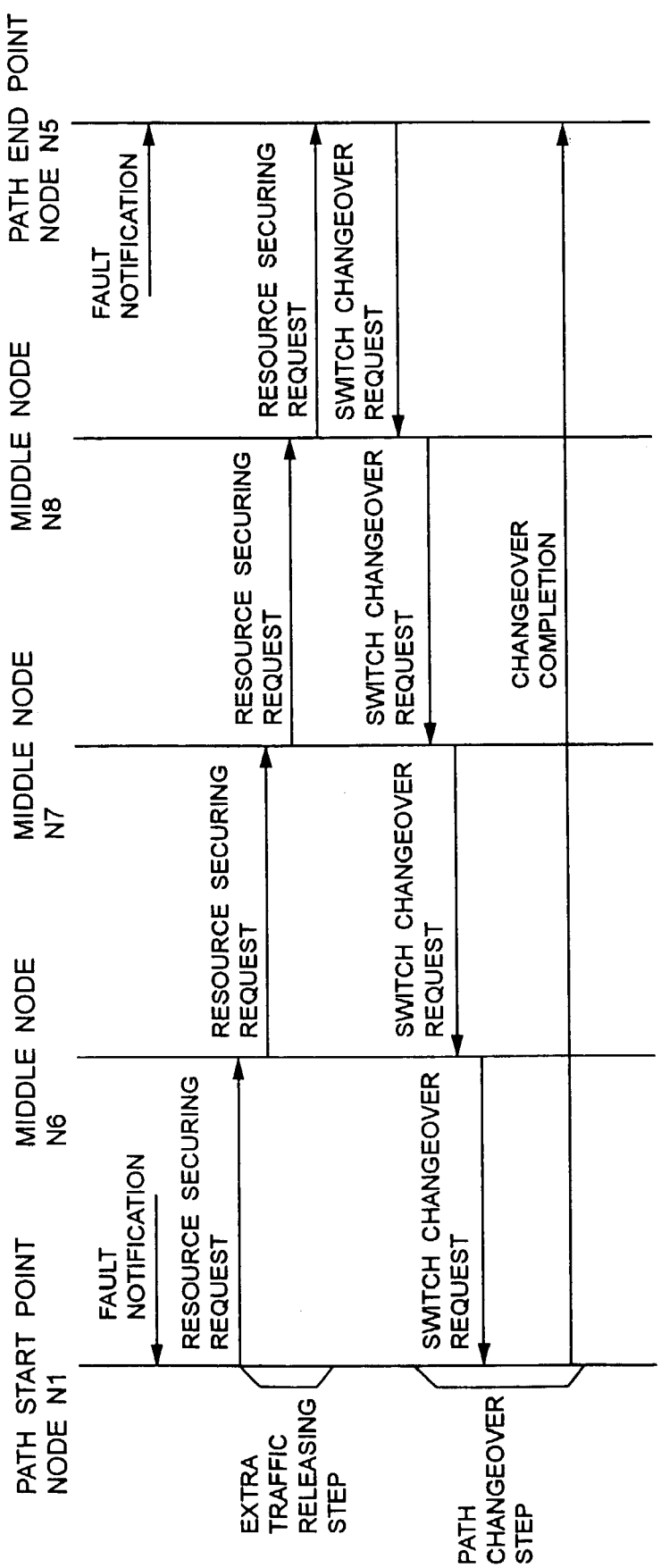
FIG. 7 is a diagram showing operations of a fault recovery method according to Example 2 of the present invention.
Figure 8:
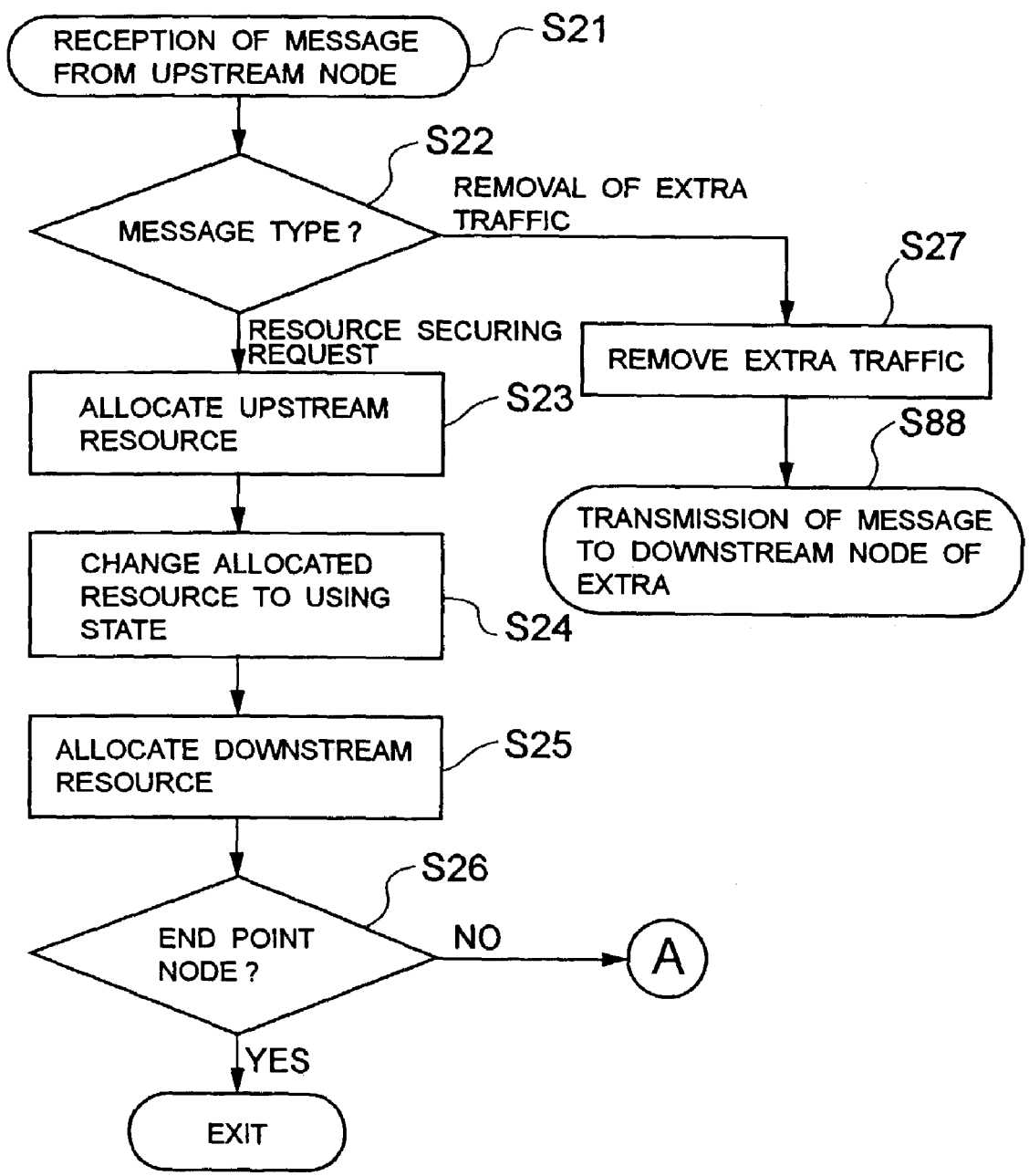
FIG. 8 is a flowchart showing the steps of securing resources according to Example 2 of the present invention.
Figure 9:
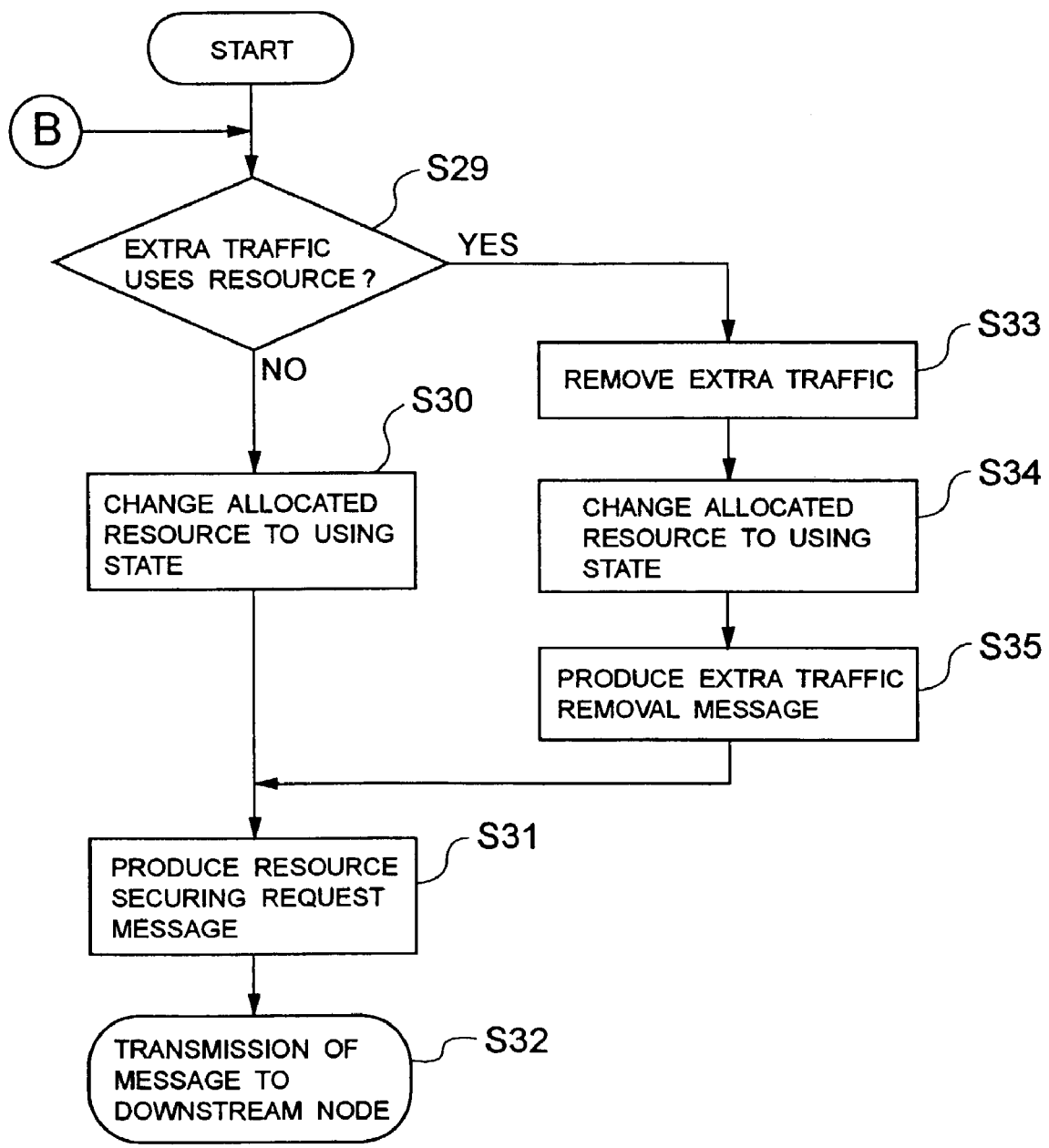
FIG. 9 is a flowchart showing the steps of securing resources according to Example 2 of the present invention.

FIG. 7 is a diagram showing the operations of a fault recovery method according to Example 2 of the present invention. FIGS. 8 and 9 are flowcharts showing the steps of securing resources according to Example 2 of the present invention. A network and nodes used in Example 2 of the present invention are identical in configuration to those of Example 1 of the present invention as shown in FIGS. 1 and 2. Further, the route of a standby path P2 is identical to that of Example 1 of the present invention as shown in FIG. 3.

Referring to FIGS. 1 to 3 and 7, the following will discuss a fault recovery operation according to Example 2 of the present invention in the case where a fault occurs on an optical fiber 10b where a two-way active path is set.

First, the following will discuss a notifying method when a fault occurs. As with Example 1 of the present invention, in Example 2 of the present invention, when a fault occurs on the optical fiber 10b on a route of a two-way active path P1, the signal monitoring sections 22 in the node N2 and the node N3 detect the fault, and the fault information is notified along the active path P1 from a start point node N1 to an end point node N5 of the active path P1 by using AIS of SONET/SDH or a signaling message. In response to the notification, the signaling section 13 in the start point N1 starts a fault recovery operation.

When the signaling section 13 in the node Ni receives notification about faults detected on a plurality of paths, a signaling section 13 inquires a priority management section 15 and determines the order of the paths to be recovered from faults according to the priority. Thereafter, the fault recovery operation is started in accordance with the priority order.

As fault recovery methods used for paths, "1+1" method, "1:1" method, and "Shared" method are higher in priority in this order. In the case of the same fault recovery method, paths with longer hop lengths are higher in priority.

Referring to FIG. 7, the following will discuss the step of releasing extra traffic P3 set on the standby path and allocating resources to the standby path P2 (resource securing step) after the signaling section 13 in the node N1 receives notification of a fault by the above-described method and the step of setting a switch 23 of the standby path P2 (path changeover step). First, the resource securing step will be described in accordance with FIGS. 8 and 9.

When fault notification is received which includes a path ID of the active path P1 having a fault, the signaling section 13 in the node N1 inquires the resource management section 11 on whether resources R1 and R2 secured for the standby path P2 are available or not (Step S29, FIG. 9). Since the resources R1 and R2 are not used for the extra traffic P3 in the node N1, the resource management section 11 changes the use states of the resources R1 and R2 of the resource database 11a to in-use and notifies the signaling section 13 of the allocation of the resources R1 and R2 (Step S30, FIG. 9).

When the resources are successfully allocated, the signaling section 13 produces a resource securing request message (Step S31, FIG. 9) including the path ID and allocated resource numbers (R1, R2) and transmits the message to an adjacent node N6 on the upstream side (Step S32, FIG. 9).

When the node N6 receives the message, the resource management section 11 allocates resources R3 and R4, which correspond to the resources in the message, to the standby path P2 (Steps S21 to S23, FIG. 8).

Next, the resource management section 11 allocates resources R5 and R6 on the downstream side. Since the extra traffic P3 is used when the resources R5 and R6 are allocated, it is necessary to firstly remove the extra traffic P3 (step S29, FIG. 9). When the extra traffic P3 is removed, the resources R5 and R6 used by the extra traffic P3 are released and the states of the resources R5 and R6 in the resource database 1a are changed to reserving states. Then, notification is sent to the switch management section 21 to set a switch 23-6 in a state in which the resources are unconnected (Step S33, FIG. 9).

When notification about completion of setting is received from the switch management section 21 and the removal of the extra traffic P3 is completed, the resource management section 11 allocates these resources to the standby path P2 and the states of the resources R5 and R6 in the resource database 1a are changed to in-use (Step S34, FIG. 9).

Subsequently, the resource management section 11 notifies the signaling section 13 that the extra traffic P3 is released, the resources R3 and R4 are allocated as upstream resources of the standby path P2, and the resources R5 and R6 are allocated as downstream resources of the standby path P2. The signaling section 13 having received the notification produces an extra traffic removal message including the path ID of the extra traffic P3 and a resource securing request message including the path ID of the standby path P2 and the downstream resource numbers (R5, R6) (Steps S35 and S31, FIG. 9), and the two messages are transmitted to an adjacent node N7 on the downstream side in the order of the extra traffic removal message and the resource securing request message (Step S32, FIG. 9).

When the node N7 receives the two messages, after the previously received extra traffic removal message is processed (Steps S27 and S28, FIG. 8), the resource securing request message is processed (Step S23 and later, FIG. 8).

The above-described processing is performed on the nodes until the end point node N5 of the standby path P2, so that the extra traffic P3 is released and the resources are allocated to the standby path P2.

Next, the changeover step of paths will be discussed. When the extra traffic P3 is released and the resources are allocated to the standby path P2, the signaling section 13 in the end point node N5 of the standby path requests the resource management section 11 to perform changeover of the switches. The resource management section 11 having received the switching request sets a switch 23-5 via the switch management section 21 so as to connect resources R15 and R16 allocated in the step of releasing the extra traffic and resources CR3 and CR4 connected to a client C2.

During this step, the signaling section 13 stands by until switch setting completion response is notified from the resource management section 11. When the switch setting completion response is received, the signaling section 13 produces a switch changeover request message including a path ID of the standby path P2 and transmits the message to the adjacent node N8.

The signaling section 13 in the node N8 having received the switch changeover request message similarly requests the resource management section 11 to set switches and stands by until the signaling section 13 receives the switch setting completion response from the resource management section 11. When the switch setting completion response is received, the signaling section 13 transmits a switch changeover request message to the adjacent node N7 via a packet transfer section 14.

Hereinafter, in the same steps, when setting of the switches 23-5 to 23-8 is completed in the nodes until the start point node N1 of the path, changeover from the active path P1 to the standby path P2 is completed and communication between clients C1 and C2 can be restarted.

Finally, when the signaling section 13 in the start point node N1 of the standby path P2 confirms normal changeover of the switches, the signaling section 13 produces a changeover completion message and transmits the message to the end point node N5 of the standby path P2. When the node N5 receives the message, the fault recovery operation is completed.

In the fault recovery method according to the present example, changeover can be performed from the active path P1 to the standby path P2 only by reciprocating a message for two times. Thus, it is possible to recover from a fault more quickly than Example 1 of the present invention.

Figure 10:
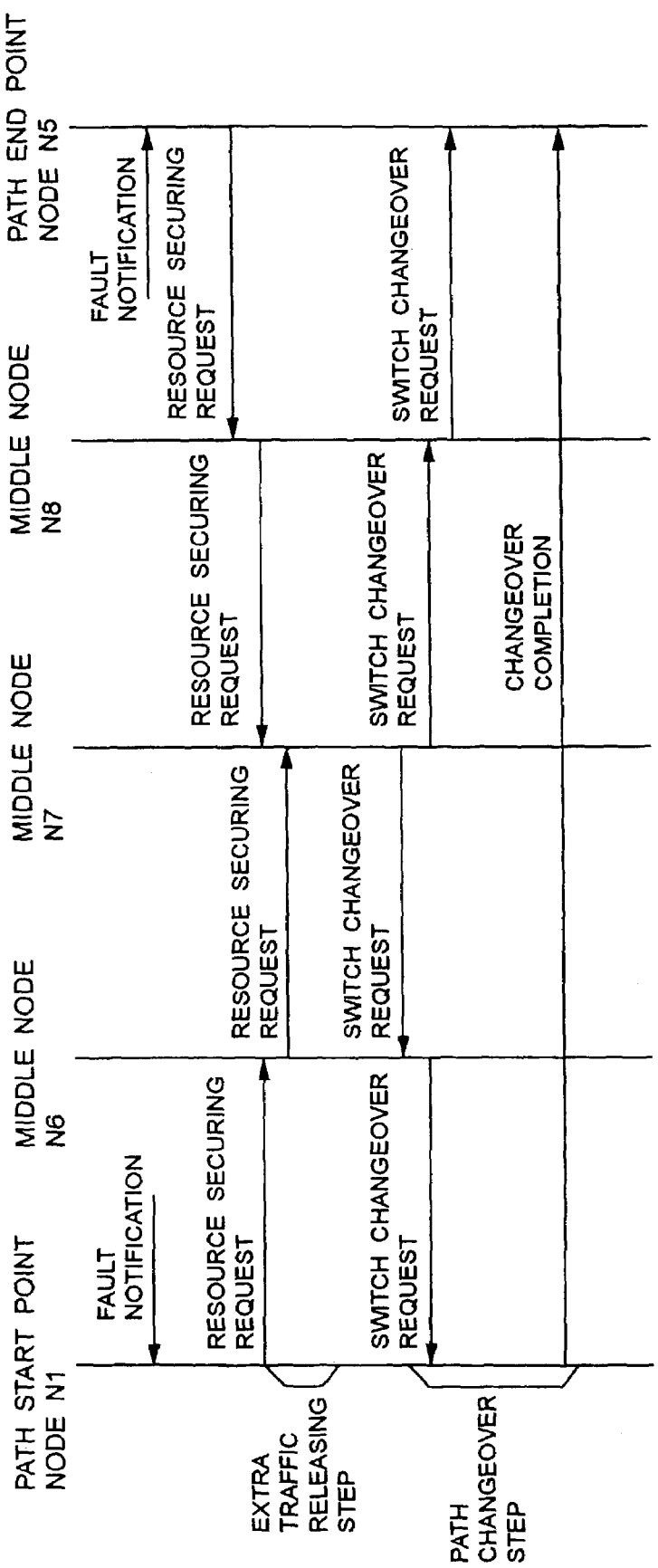
FIG. 10 is a diagram showing operations of a fault recovery method according to Example 3 of the present invention.
Figure 11:
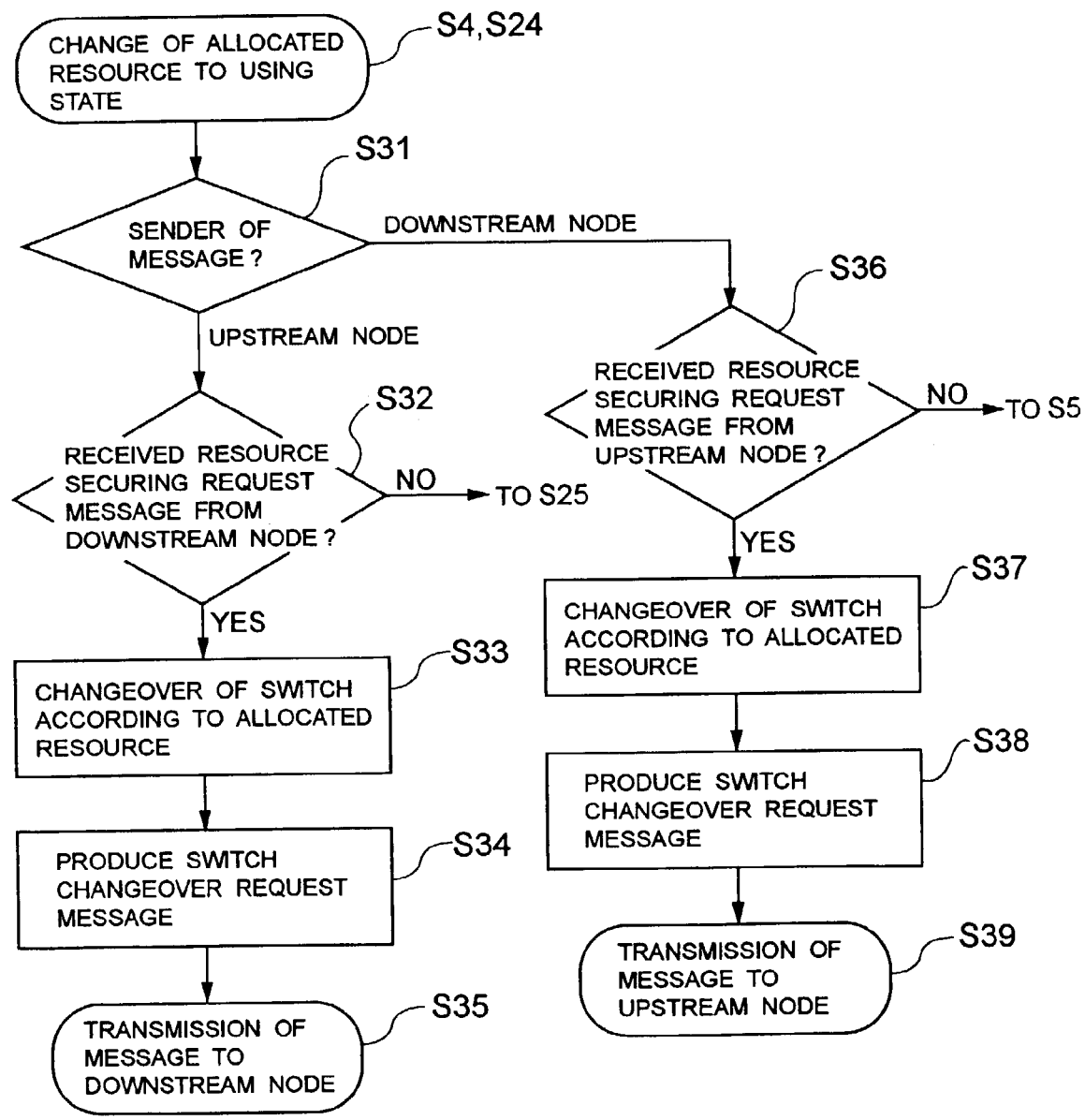
FIG. 11 is a flowchart showing the steps of setting switches according to Example 3 of the present invention.

FIG. 10 is a diagram showing an operation of a fault recovery method according to Example 3 of the present invention. FIG. 11 is a flowchart showing the steps of setting switches according to Example 3 of the present invention. A network and nodes used in Example 3 of the present invention are identical in configuration to those of Example 1 of the present invention as shown in FIGS. 1 and 2. Further, the route of a standby path P2 is also identical to that of Example 1 of the present invention as shown in FIG. 3.

First, the following will discuss a notifying method according to Example 3 of the present invention when a fault occurs. As with Example 1 of the present invention, when a fault occurs on the optical fiber 10b on a two-way active path P1 in Example 3 of the present invention, a signal monitoring section 22 in a node N2 and a node N3 detects the fault, and the fault information is notified along the active path P1 from a start point node N1 to an end point node N5 of an active path P1 by using AIS of SONET/SDH or a signaling message. In response to the message, signaling section 13 in the node N1 and the node N5 starts a fault recovery operation.

When the signaling section 13 in the node Ni and the node N5 receives notification about faults detected on a plurality of paths, the signaling section 13 inquires a priority management section 15 and determines the order of the paths to be recovered from faults according to the priority. Thereafter, the fault recovery operation is started in accordance with the priority order. As fault recovery methods used for paths, "1+1" method, "1:1" method, and "Shared" method are higher in priority in this order. In the case of the same fault recovery method, paths with longer hop lengths are higher in priority.

Referring to FIGS. 1 to 3 and 10, the following will discuss the step of releasing extra traffic P3 set on the standby path and allocating resources to the standby path P2 (resource securing step) after the signaling section 13 in the node N1 and the node N5 receives fault notification by using the above methods and the step of setting a switch 23 of the standby path P2 (path switching step).

The resource securing step from the node N5 and the node N1 is started in the same steps as those of Example 1 and Example 2 according to the present invention. A middle node having received a resource securing request message transmits a resource securing request message or a switch changeover message to the upstream side and the downstream side in accordance with the flowcharts of FIGS. 5, 6, 8, 9, and 11.

As shown in FIG. 11, when a resource securing request message is received from an upstream or downstream node, if a resource securing request message has been already received from the downstream node or upstream node (Steps S32 and S36, FIG. 11), the switch 23 is set according to the allocated resources (Steps S33 and S37, FIG. 11), a switch changeover request message is further produced (Steps S34 and S38, FIG. 11), and the message is transmitted to a node of a subsequent hop on the upstream side and the downstream side (Steps S35 and S39, FIG. 11).

For example, in FIG. 10, since resource securing request messages from the start point node N1 and the end point node N5 intersect on a node N7, the signaling section 13 in the node N7 transmits a switch changeover request message to a node N6 and a node N8. The node N6 and the node N8 having received the switch changeover request message set switches 23-6 and 23-8 according to resources (R7, R9) and (R8, R10) allocated when the securing request is made.

When the switch changeover request message is transferred along the standby path and reaches both of the start point node N1 and the end point node N5, switching from the active path Pi to the standby path P2 is completed. When the start point node N1 completes the changeover of a switch 23-1, a changeover completion message is produced and is transmitted to the end point node N5. Finally, when setting of a switch 23-5 of the endpoint node N5 is completed and a changeover completion message is received, the fault recovery operation is completed.

In the fault recovery method of the present example, recovery from a fault is started simultaneously on the start point node N1 and the end point node N5. Thus, it is possible to recover from a fault more quickly than Example 1 and Example 2 of the present invention.

As Example 4 of the present invention, the following will discuss a backup fault recovery operation when recovery from a fault ends in failure in Example 1 of the present invention.

Figure 12:
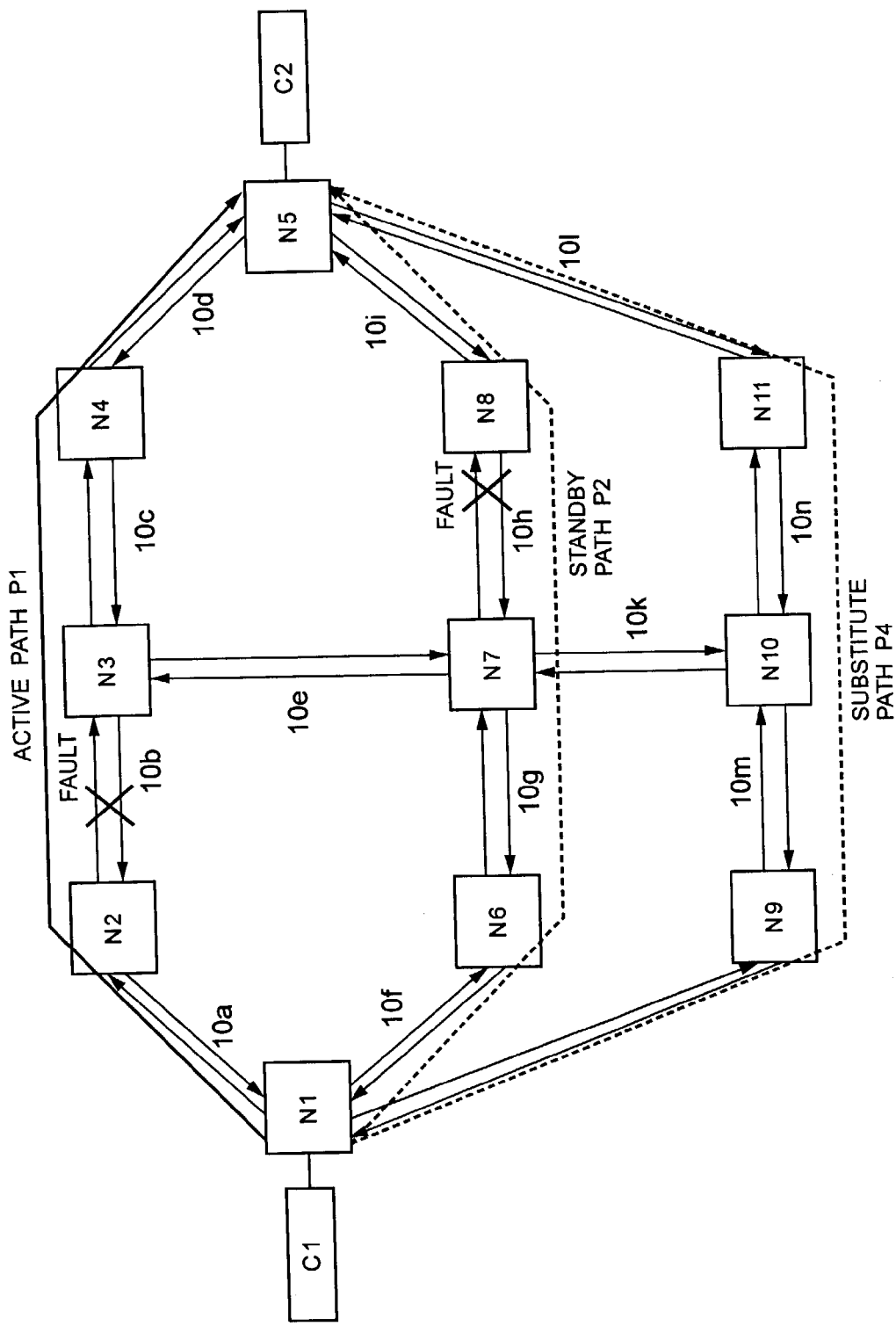
FIG. 12 is a diagram showing a network with failed recovery from a fault according to Example 1 of the present invention.
Figure 13:
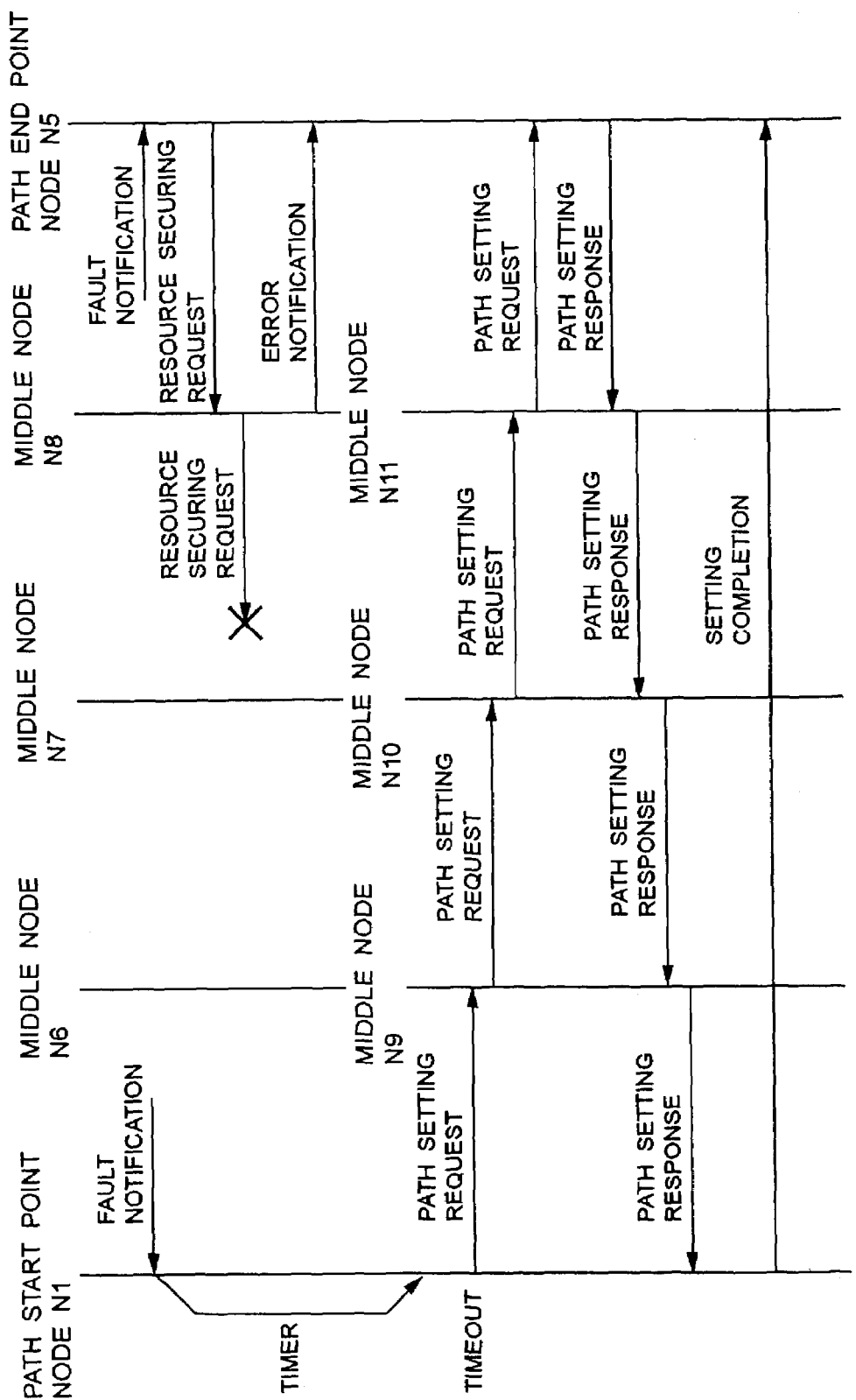
FIG. 13 is a diagram showing operations of a backup fault recovery method according to Example 4 of the present invention.

FIG. 12 is a diagram showing a network in the event of failed recovery in Example 1 of the present invention. FIG. 13 is a diagram showing an operation of a backup fault recovery method according to Example 4 of the present invention.

Referring to FIG. 12, the following will discuss the case where a fault occurs on an optical fiber 10b on a path where an active path P1 is set and simultaneously a fault occurs on an optical fiber 10h on a path where a standby path P2 is set.

When a fault recovery method according to Example 1 of the present invention is used, a fault on the active path P1 is informed to a start point node N1 and an end point node N5, and a fault recovery operation is started from the end point node N5.

However, since the fault occurs on the optical fiber 10h on the route of the standby path P2, setting cannot be performed on the standby path P2. In this case, Example 4 of the present invention performs the backup fault recovery method according to the steps of FIG. 13.

In FIG. 13, although the end point node N5 starts the fault recovery operation according to Example 1 of the present invention, it is noted that setting cannot be performed on the standby path P2 due to a fault on the optical fiber 10h when a resource securing request message is transmitted from a node N8 to a node N7. Hence, the node N8 transmits an error notification message including error information of "setting fault, fault position: fiber 10h" to the node N5. The end point node N5 having received the error notification message waits for the start of the backup fault recovery operation of the start point node Ni without doing anything.

Meanwhile, a timer (not shown) is started on a signaling section 13 in the start point node N1, which has received notification of a fault on the active path P1. The timer has the function of notifying the signaling section 13 of timeout at a predetermined time. When the signaling section 13 in the node N1 does not receive a resource securing request message for the standby path P2 during the time-out period, the signaling section 13 starts a backup fault recovery operation for setting a substitute path P4.

First, a method for determining the route of the substitute path P4 will be discussed. The signaling section 13 having started a fault recovery operation finds out routes from path database 13a based on the path IDs of the active path P1 and the standby path P2, and the signaling section 13 requests a routing section 12 to calculate a route other than these routes (N1-N2-N3-N4-N5 and N1-N6-N7-N8-N5).

The routing section 12 having received the request determines another route (N1-N9-N10-N11-N5) from the node N1 to the node N5 by using Dijkstra's algorithm in a topology obtained by removing the routes of the active path P1 and the standby path P2 from topology database 12a.

Subsequently, by using FIG. 13, the following will discuss the steps of setting the substitute path P4 for recovery on the route. When route information is received from the routing section 12, the signaling section 13 in the node N1 requests a resource management section 21 based on the route information to secure a vacant resource of a switch 23-1 connected to an adjacent node N9. When the resource management section 21 sends a response that securing of the resource is completed, the signaling section 13 produces a path setting request message and transmits the message to the adjacent node N9.

When the path setting request message is received, the signaling section 13 in the adjacent node N9 secures a resource corresponding to resource information via the resource management section 11. The resource information is included in the message. Subsequently, the signaling section 13 requests the resource management section 11 based on the route information to secure a vacant resource connected to an adjacent node N10. When response is made to the request, the signaling section 13 transmits a path setting request message to the adjacent node N10. Hereinafter, the above-described operation is repeated on the nodes until the end point node N5.

When a resource is allocated to the node N5, the signaling section 13 requests the resource management section 11 to perform changeover of a switch 23-5 from the active path P1 to the newly set substitute path P4 according to the allocated resource. Upon completion of setting of the switch 23-5, the signaling section 13 produces a path setting response message and transmits the message to an adjacent node N11.

The nodes having received the path setting response message set a switch 23 according to the allocated resources and transmit the path setting response message to adjacent nodes. When the start point node N1 receives the message, the resource management section 11 is requested to perform changeover of a switch 23-1 from the active path P1 to the newly set substitute path P4. When the resource management section 11 performs changeover of the switch 23-1 via the switch management section 21, recovery from the fault is completed. After recovery from the fault, the start point node N1 transmits a changeover completion message to the end point node N5. When the end point node N5 receives the message, the backup fault recovery operation is completed.

In the fault recovery method of the present example, even when changeover to the prepared standby path P2 ends in failure, it is possible to quickly recover from a fault by setting another substitute path P4 and performing changeover from the active path P1 to the substitute path P4.

Further, in the present example, the route of the substitute path P4 is determined except for the routes of the active path P1 and the standby path P2 that may include a fault section, thereby eliminating the possibility of selection of a route having a fault. Namely, there is an extremely low possibility of failed setting of the substitute path P4.

As Example 5 of the present invention, the following will discuss a backup fault recovery operation in the event of failed recovery in Example 2 of the present invention. Referring to FIG. 12, the following will discuss the case where a fault occurs on an optical fiber lob on a path where an active path P1 is set and simultaneously a fault occurs on an optical fiber 10h on a path where a standby path P2 is set. When a fault recovery method according to Example 2 of the present invention is used, a fault on the active path P1 is notified to a start point node N1 and an end point node N5, and a fault recovery operation is started from the start point node N1.

However, since a fault occurs on the optical fiber 10h on the route of the standby path P2, setting ends in failure on the standby path P2. In this case, Example 5 of the present invention performs a backup fault recovery method by using the steps of FIG. 14.

Figure 14:
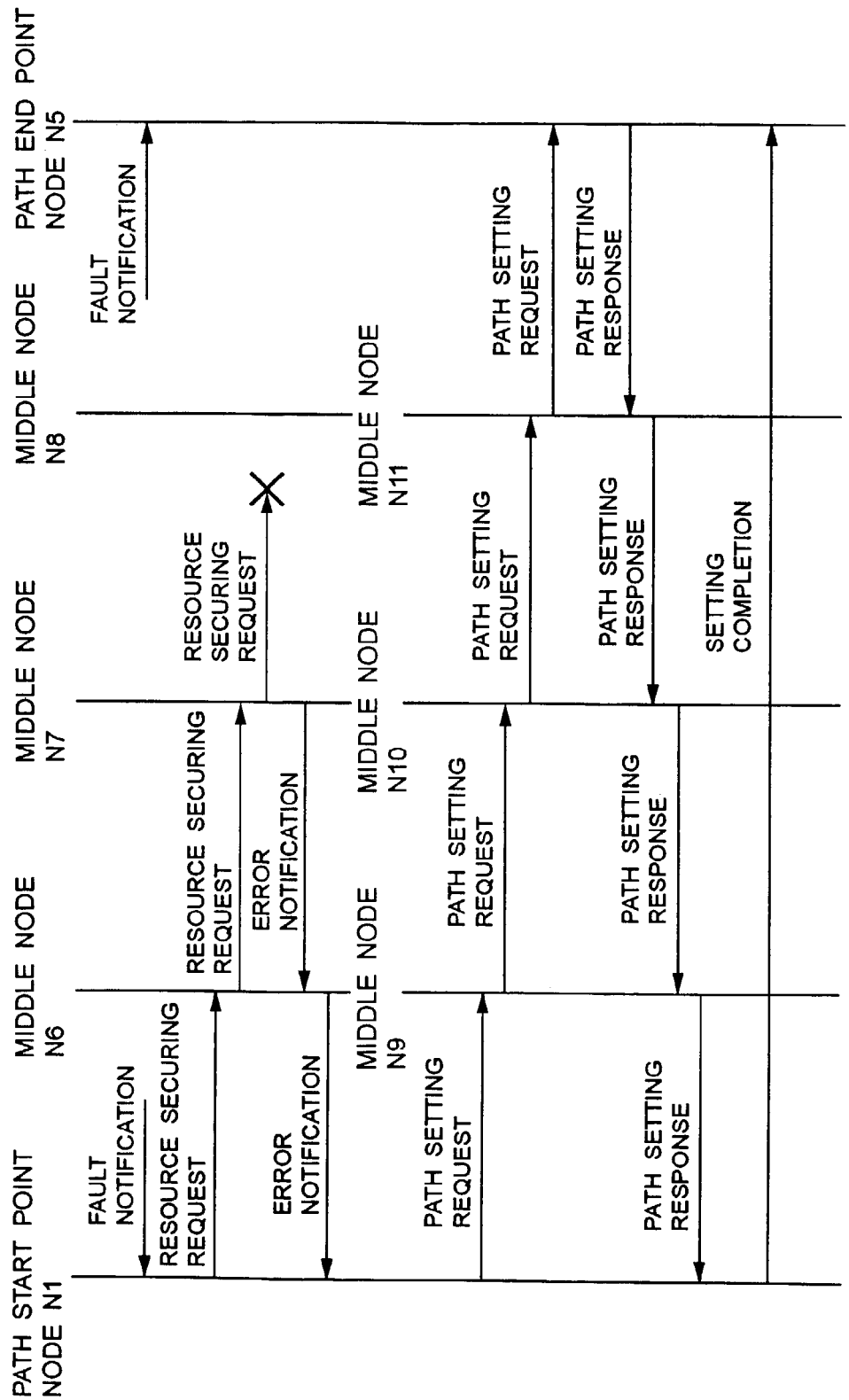
FIG. 14 is a diagram showing the operations of a backup fault recovery method according to Example 5 of the present invention.

FIG. 14 is a diagram showing operations of the backup fault recovery method according to Example 5 of the present invention. In FIG. 14, although the start point node N1 starts the fault recovery operation according to Example 2 of the present invention, it is noted that setting cannot be performed on the standby path P2 due to a fault on the optical fiber 10h when a resource securing request message is transmitted from a node N7 to a node N8.

Hence, the node N7 transmits an error notification message including error information of "setting fault, fault position: fiber 10h" to a node N6. The error notification message is transferred to the node N6 and the node N1 in this order. A signaling section 13 in the node N1 having received the error notification message starts a backup fault recovery operation for setting a substitute path P4.

First, a method for determining the route of the substitute path P4 will be discussed. The signaling section 13 having started a fault recovery operation finds out the route of the active path P1 from path database 13a based on a path ID, and the signaling section 13 requests a routing section 12 to calculate a route except for the route (N1-N2-N3-N4-N5) and the fiber 10h received from the error notification message.

The routing section 12 having received the request determines another route (N1-N9-N10-N11-N5) from the node Ni to the node N5 by using Dijkstra's algorithm in a topology obtained by removing the route of the active path P1 and the fiber 10h from topology database 12a.

Referring to FIG. 14, the following will discuss the steps of setting the substitute path P4 for recovery of a fault on the route. When route information is received from the routing section 12, the signaling section 13 in the node N1 requests a resource management section 11 based on the route information to secure a resource of a switch 23-1 connected to an adjacent node N9. When the resource management section 11 sends a response that reservation of the resource is completed, the signaling section 13 produces a path setting request message and transmits the message to an adjacent node N9.

When the path setting request message is received by the signaling section 13 in the adjacent node N9, the resource management section 11 secures a resource of the switch 23 that corresponds to resource information. The resource information is included in the message. Subsequently, the signaling section 13 requests the resource management section 11 based on the route information to secure a vacant resource to an adjacent node N10. When response is made to the request, the signaling section 13 transmits a path setting request message to the adjacent node N10. Hereinafter, the above-described operation is repeated on the nodes until the end point node N5.

When a resource is allocated to the node N5, the signaling section 13 requests the resource management section 11 to perform changeover of the switch 23 from the active path P1 to the newly set substitute path P4 according to the allocated resource. Upon completion of setting of the switch 23, the signaling section 13 produces a path setting response message and transmits the message to an adjacent node N11.

The nodes having received the path setting response message set the switch 23 according to the allocated resources and transmit the path setting response message to adjacent nodes. When the start point node N1 receives the message, the resource management section 11 is requested to perform changeover of the switch 23 from the active path P1 to the newly set substitute path P4. When the resource management section 11 performs changeover of the switch 23 via the switch management section 21, fault recovery is completed.

After recovery from a fault, the start point node N1 transmits a switching completion message to the end point node N5. When the end point node N5 receives the message, the backup fault recovery operation is completed.

In the fault recovery method of the present example, even when switching to the prepared standby path P2 ends in failure, recovery from the fault can be performed quickly by setting another substitute path P4 and performing changeover from the active path P1 to the substitute path P4. Further, the route of the substitute path P4 is determined except for the routes of the active path P1 that may include a fault section and the optical fiber 10h that is a fault section, thereby setting the substitute path P4 except for a failed point in an efficient manner as compared with Example 4 of the present invention.

In the backup fault recovery methods according to Example 4 and Example 5 of the present invention, the following operation is also applicable: after completion of changeover from the active path P1 to the substitute path P4, a removal request message is transferred hop by hop along the active path P1 having a fault, the active path P1 is removed, and then, the substitute path P4 is used as an active path.

Moreover, the backup fault recovery methods according to Example 4 and Example 5 of the present invention described the step of starting recovery from the start point node of the path when another path is set to recover from a fault. Since an error notification message is received in Example 4 of the present invention and the timer has timeout in Example 5 of the present invention, it is apparent that recovery can be started from the end point node of the path.

Figure 15:
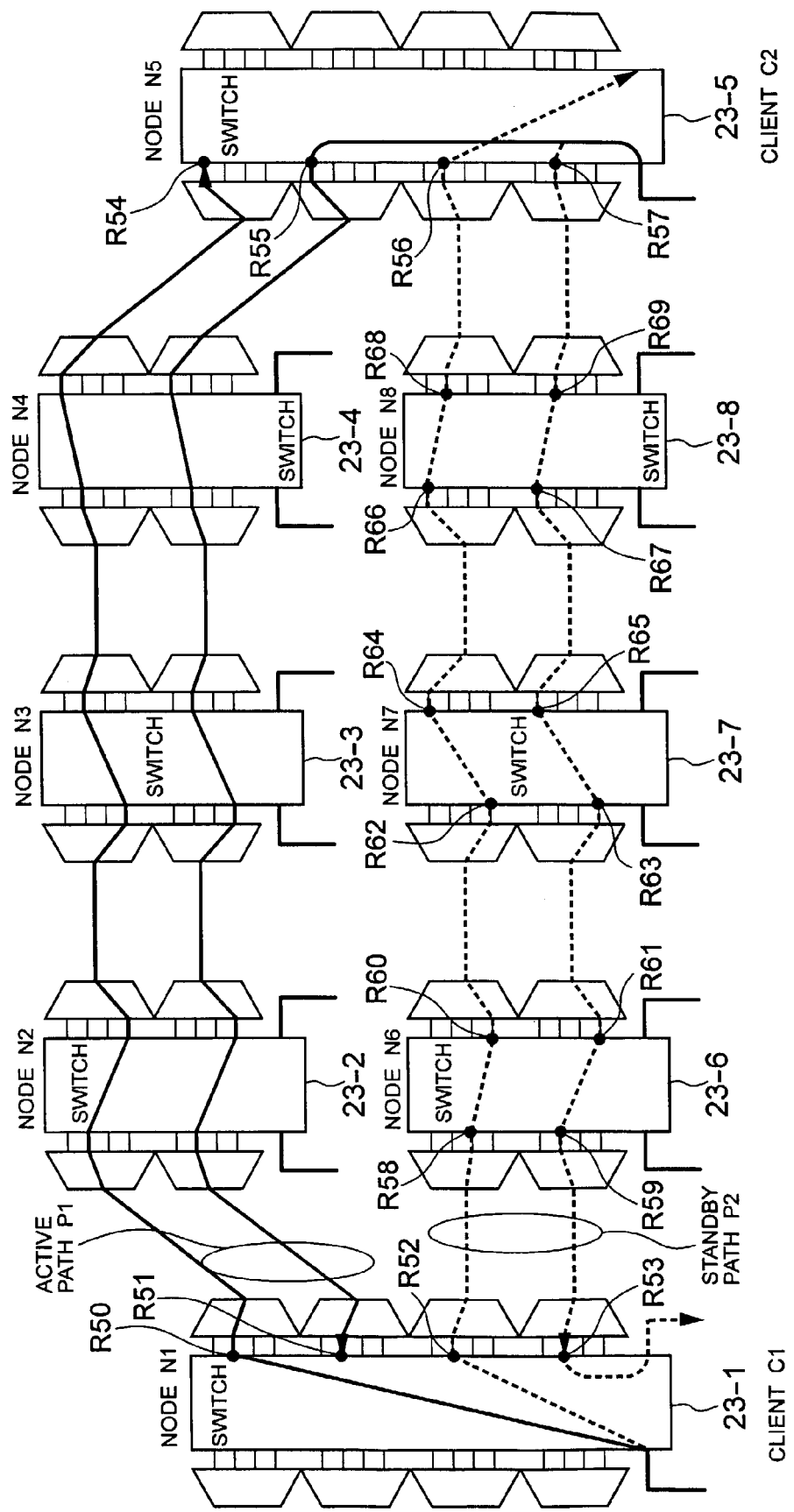
FIG. 15 is a block diagram showing the routes of an active path and a standby path when the active path recovers from a fault according to Example 6 of the present invention.
Figure 16:
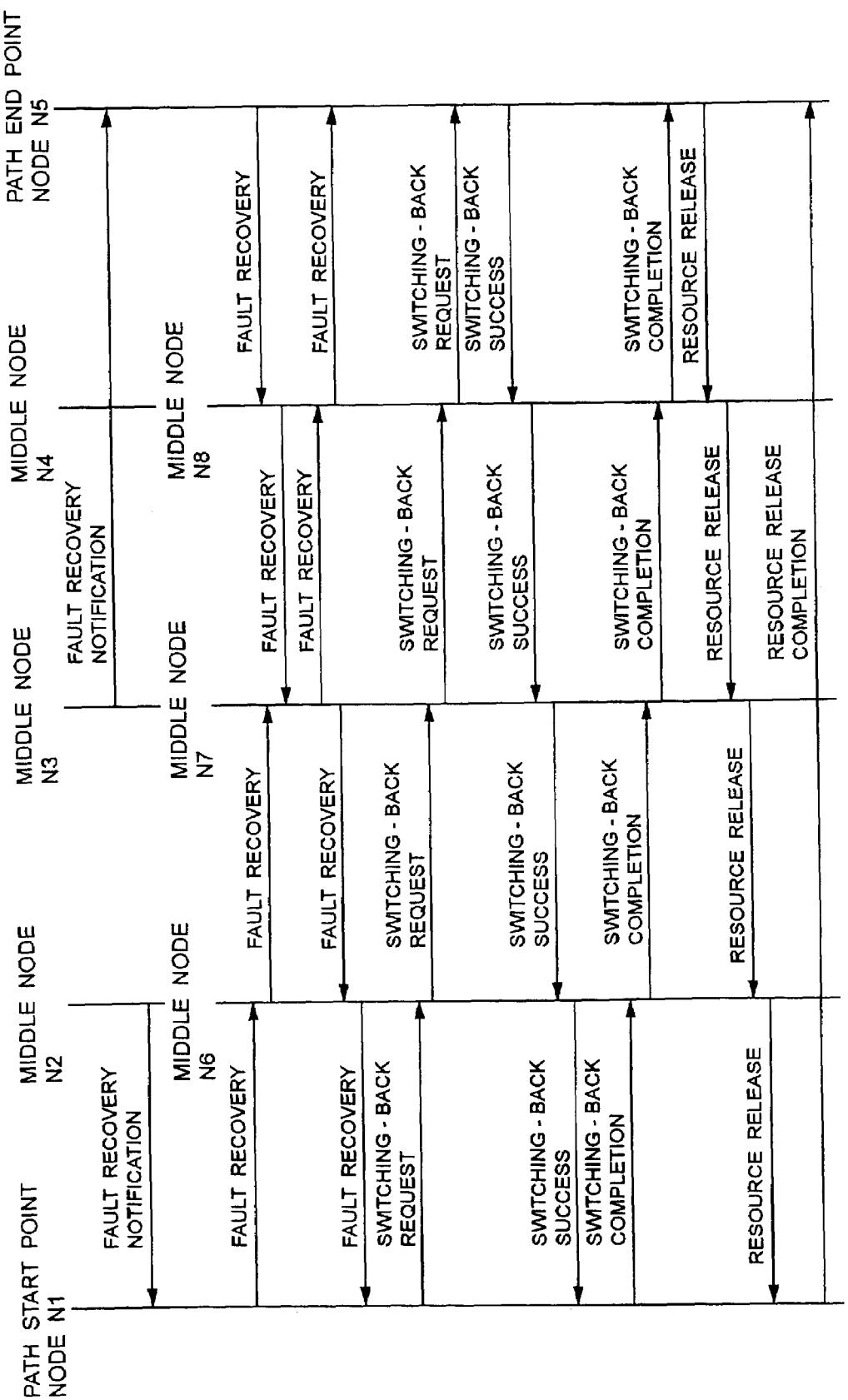
FIG. 16 is a diagram showing a switching-back operation from a standby path to an active path according to Example 6 of the present invention.

FIG. 15 is a block diagram showing the routes of the active path P1 and the standby path P2 when the active path P1 is recovered from a fault in Example 6 of the present invention. FIG. 16 is a diagram showing a switching-back operation from the standby path P2 to the active path P1 in Example 6 of the present invention.

In FIG. 15, the two-way routes of the active path P1 and the used standby path P2 are in a bridge (both of the active path P1 and the standby path P2 are connected to clients C1 and C2) on transmitting-end nodes N1 and N5, and the standby path P2 is connected to the clients C1 and C2 on receiving-end nodes N5 and N1.

Referring to FIGS. 15 and 16, the following will discuss a switching-back operation from the standby path P2 to the active path P1 when the active path P1 recovers from a fault.

When a monitoring section 22 in a node N2 and a node N3 detects fault recovery of an optical fiber 10b, the monitoring section 22 notifies a signaling section 13 of the fault recovery via a resource management section 11. The signaling section 13 having received the notification searches a start point node and an end point node of the active path P1 set for the failed fiber 10b from path database 13a to obtain the node N1 and the node N5. Then, the signaling section 13 produces a fault recovery notification message including the path ID of the active path P1 and transmits the message to the nodes.

The signaling section 13 in the start point node N1 and the end point node N5 having received the message transmits a fault recovery message including the path ID of the active path P1 to adjacent nodes N6 and N8. The message is transferred hop by hop to nodes on a route along the standby path P2 and finally reaches the end point node N5 and the start point node N1.

When notification of fault recovery has not received yet, the signaling section 13 in the start point node N1 having received the fault recovery message stands by until reception of notification of recovery. When notification of fault recovery has been received, in the two-way path, a path directed from the end point node N5 to the start point node N1 is switched from the standby path P2 to the active path P1 via a resource management section 11 (that is, switched from a resource R53 to a resource R51).

Upon completion of switching, the signaling section 13 transmits a switching-back request message including the path ID of the active path to an adjacent node N6. The message is transferred hop by hop to nodes on a route along the standby path P2 and is finally received by the signaling section 13 in the end point node N5. Then, in the two-way path, a path directed from the start point node N1 to the end point node N5 is switched from the standby path P2 to the active path P1 via the resource management section 11 (that is, switched from a resource R56 to a resource R54).

Further, the path bridged on both of the active path P1 and the standby path P2 from the end point to the start point is released, and changeover is performed in such a manner as to make connection only to the active path P1 (that is, connected only to a resource R55).

When the bridge is released, the signaling section 13 transmits a switching success message including the path ID of the active path P1 to the adjacent node N8. The message is transferred hop by hop to nodes on the path along the standby path P2 and is finally received by the signaling section 13 of the start point node N1. Then, in the two-way path, a bridge is released on the path bridged on both of the active path P1 and the standby path P2 from the start point node N1 to the end point node N5, and changeover is performed in such a manner as to make connection only to the active path P1 (that is, connected only to a resource R50).

The above-described operation completes the switching-back operation to the active path P1 from the standby path P2. Then, the signaling section 13 in the start point node N1 produces a switching-back completion message including the path ID of the active path P1 and transmits the message to the adjacent node N6. The message is transferred hop by hop to the nodes on the route along the standby path P2 and is finally received by the signaling section 13 in the end point node N5. Then, an operation of releasing resources of the standby path is performed.

To release resources of the standby path P2, the signaling section 13 in the end point node N5 requests the resource management section 11 to release resources R56 and R57 used by the standby path P2. When the resources are released, the signaling section 13 produces a resource release message and transmits the message to the adjacent node N8.

When the signaling section 13 in the node N8 receives the resource release message, the signaling section 13 requests the resource management section 11 to release resources R66, R67, R68, and R69 used by the standby path P2. When the resources are released, the switching state of the resources released via the resource management section 11 and a switch management section 21 is set at an unconnected state. After completion of setting of a switch 23-8, the resource release message is transmitted to an adjacent node.

In middle nodes having received the resource release message, the same operation as that of the node N8 is performed and the start point node N1 finally receives the resource release message. When the resources R52 and R53 are released, the release is completed for the resources of the standby path P2. Finally, the signaling section 13 in the start point node N1 transmits a resource release completion message to the end point node N5. When the signaling section 13 in the end point node N5 receives the message, the switching-back and resource releasing operations are completed.

In Example 6 of the present invention, after the active path P1 is recovered from a fault, switching-back is made from the standby path P2 to the active path P1. Then, to release the resources of the standby path P2, the path can be switched back without cutting off communication between the clients C1 and C2.

In Example 6 of the present invention, the fault recovery message, the switching-back request message, the switching-back success message, and the switching-back completion message are transferred hop by hop along the route of the standby path P2. These messages can be also directly exchanged between the start point node N1 and the end point node N5.

The present example discussed a fault recovery operation when a fault occurs on the two-way path and a switching-back operation when the path is recovered from a fault. It is apparent that these methods are also applicable to a one-way path.

Figure 17:
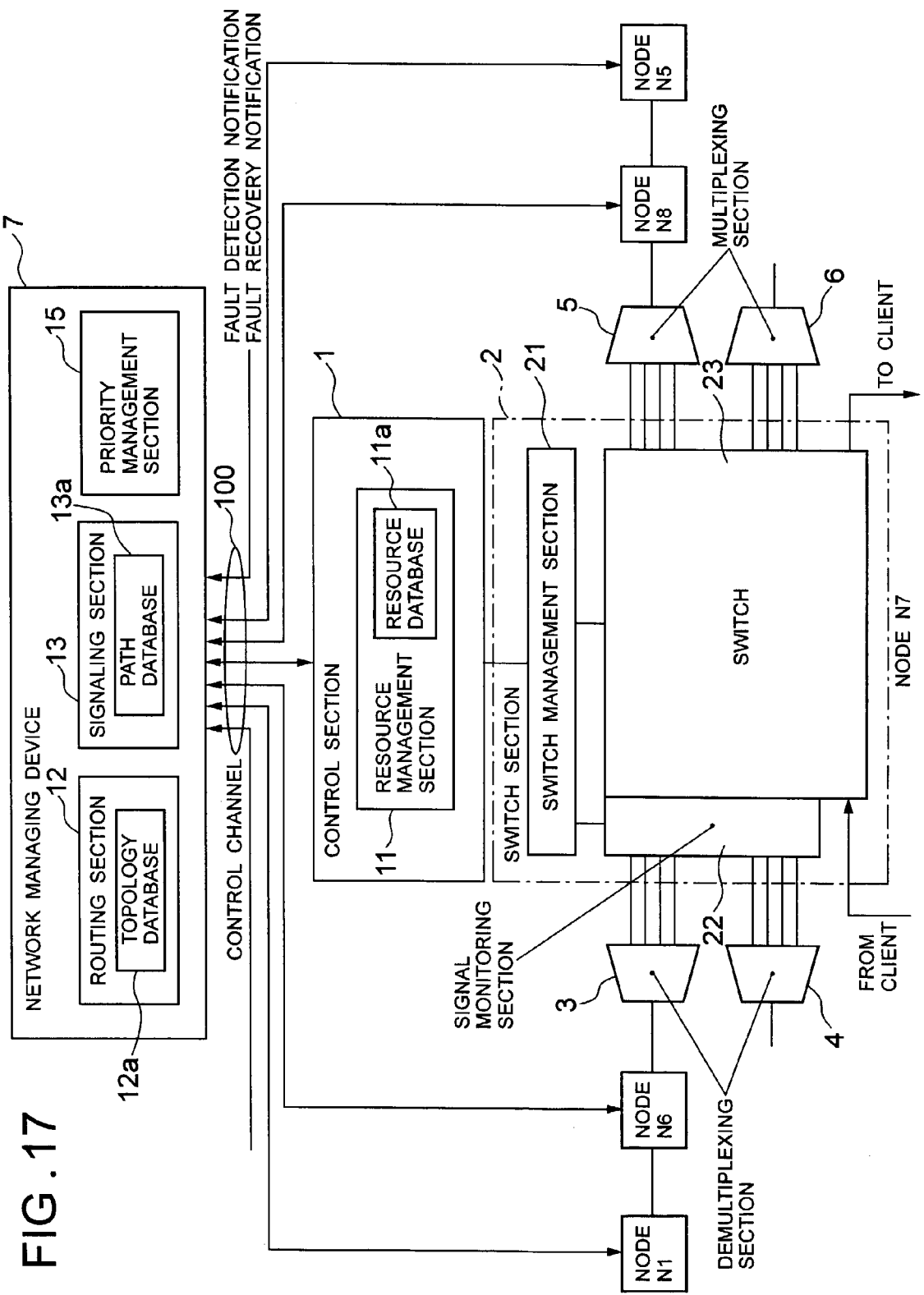
FIG. 17 is a block diagram showing a structural example of a network and nodes that are controlled by a network managing device of the present invention.

FIG. 17 is a block diagram showing a structural example of a network and nodes that are controlled by a network managing device. Example 1, Example 2, and Example 3 of the present invention can be realized also in a network having nodes controlled by a network managing device 7, which is composed of a routing section 12, a signaling section 13, a packet transfer section (not shown), and a priority control section 15 shown in FIG. 17. In this case, the messages used in the present invention are exchanged in the same steps as the examples of the present invention via a control channel 100 for connecting the network managing device 7 and the nodes N1 and N5 to N8.

Further, in FIG. 17, the network managing device 7 can also manage the resources of the nodes in the network by using the resource managing section 11. In this case, the switch 23 of the nodes is controlled by the network managing device 7.

In this way, in the present invention, when an extra traffic P3 flows in the preset standby path P2, since releasing of the extra traffic P3 is performed before the standby path P2 is set, changeover can be performed to the standby path P2 without permitting data, which flows from the clients C1 and C2 in a path to be recovered from a fault, to be transferred along the route of the extra traffic P3.

In the present invention, when the extra traffic P3 flows in the preset standby path P2, since resources are secured concurrently with release of the extra traffic P3, it is possible to positively set the standby path P2 promptly without allowing the other paths to take the resources.

In the present invention, when a plurality of paths needs to be recovered from faults, the order of recovery is managed by the priority managing section 15. Hence, fault recovery time can be provided in such a manner as to meet requests of all the paths.

In the present invention, even when switching to the prepared standby path P2 ends in fault, changeover can be performed to another substitute path P4, thereby providing a fault recovery method with high reliability.

In the present invention, after a current system is recovered from a fault, it is possible to provide a method of switching-back from the standby path P2 to the active path P1 without cutting off communication between the clients C1 and C2.

As described above, according to the optical path fault recovery method of the present invention, it is possible to promptly set a standby path and perform changeover from an active path to the standby path without making an improper connection in the event of a fault on the active path in the following case: an extreme point node of a path having received notification of a fault on the active path issues a resource securing request message which is transferred hop by hop to the opposite extreme point node along the route of the standby path, after extra traffic is released and resources reserved for the standby path are secured in the nodes on the route of the standby path having received the message, a switch changeover request message is issued, and switches are set in accordance with the resources secured by the nodes having received the message, and the resources of the standby path are used by the extra traffic.

Moreover, in another optical path fault recovery method of the present invention, even when a standby path cannot be set due to a fault on the standby path, another substitute path is set on a route other than a fault section to switch an active path having a fault to the substitute path. Hence, in the event of a fault on the active path, when setting of the standby path ends in failure during changeover from the active path to the standby path, it is possible to achieve recovery with high reliability by using a backup fault recovery method.

Furthermore, in a switching-back method of the present invention, by switching an active path and a standby path in a bridge state when an active path is recovered from a fault, it is possible to switch back the standby path to the active path without cutting off communication between clients when the active path is recovered from a fault.

What is claimed is:

1. A path fault recovery method, in which a first extreme point node of an active path issues a resource securing request message and a second extreme point node of the active path issues a switch changeover request message, the messages being transferred hop by hop to the other extreme point node along the route of a predetermined standby path, the method comprising:

releasing extra traffic in response to receipt of the resource securing request message, wherein the extra traffic is communicated traffic which is supposed to be removed from the standby path, and the resource securing request message is delivered only to specific nodes on the standby path which are required to release the extra traffic, wherein the specific nodes on the standby path are urged to release the extra traffic in response thereto, securing a resource reserved for the standby path after releasing the extra traffic, and setting a switch of each node on the route of the standby path according to the secured resource in response to receipt of the switch changeover request message issued from the second extreme point node after the resource is secured for each node on the route of the standby path.

2. The path fault recovery method according to claim 1, wherein if setting of the switch of each node on the route of the standby path ends in failure, the method further comprises setting a substitute path having a route without a fault section, and switching the active path to the substitute path.

3. The path fault recovery method according to claim 2, wherein when the active path recovers from a fault, switching-back is performed from one of the standby path and the substitute path in a bridge state to the active path, the bridge state having both of the active path and one of the standby path and the substitute path connected to a client.

4. The path fault recovery method according to claim 3, wherein when the standby path is used due to the fault on the active path, one of the extreme point nodes having received a fault recovery notification of the active path transmits a fault recovery message to the other extreme point node, switching-back is performed from the standby path to the active path by exchanging a switching-back request message, a switching-back success message, and a switching-back completion message between the extreme point nodes to perform changeover of each switch in the extreme point nodes for switching paths, and then, the resource of the standby path is released and the switch of each node on the route of the standby path is set at an unconnected state.

5. The path fault recovery method according to claim 2, wherein when the active path and the standby path are set in advance between the first extreme point node and the second extreme point node, after changeover is performed to the standby path due to a fault detected on the active path, in the case where failed setting of the switch of each node on the route of the standby path is detected, a route from the first extreme point node to the second extreme point node not having the fault section is calculated, the substitute path is set along the route, and the active path is switched to the substitute path.

6. The path fault recovery method according to claim 1, wherein when the active path and the standby path are set in advance between the first extreme point node and the second extreme point node, one of the extreme point nodes having received a fault notification of the active path issues the resource securing request message, the extra traffic using the resources of the standby path is released and the resource of the standby path is secured, and then, the other extreme point node issues the switch changeover message to set the switch according to the secured resource, the switch performing changeover of the paths.

7. The path fault recovery method according to claim 1, wherein when the active path and the standby path are set in advance between the first extreme point node and the second extreme point node, a network managing device for managing the overall network issues the resource securing request message to each node on the route of the standby path in response to receipt of notification of a fault on the active path, the node having received the resource securing request message releases the extra traffic using the resource of the standby path and secures the resource of the standby path, the network managing device issues the switch changeover message to each node on the route of the standby path, and the node having received the switch changeover message sets the switch according to the secured resource, the switch performing changeover of the paths.

8. The path fault recovery method according to claim 1, wherein when the active path and the standby path are set in advance between the first extreme point node and the second extreme point node, after a network managing device managing the overall network and having received notification of a fault on the active path releases the extra traffic using the resources of the standby path and secures the resource of the standby path, the network managing device issues the switch changeover request message to each node on the route of the standby path, and the node having received the switch changeover request message sets the switch according to the resource secured by the network managing device, the switch performing changeover of the paths.

9. A path fault recovery method for a communication network comprising a plurality of nodes, each including a control section for processing a control message and a switch for switching paths, a control channel for connecting the control sections of the plurality of nodes, and a link for connecting the switches of the plurality of nodes, the method comprising:

wherein if an active path and a standby path are set in advance between a first extreme point node and a second extreme point node, issuing a resource securing request message from one of the extreme point nodes having received a fault notification of the active path, wherein the resource securing request message is delivered only to specific nodes on the standby path which are required to release extra traffic, wherein the specific nodes on the standby path are urged to release the extra traffic in response thereto;

releasing the extra traffic which is using a resource of the standby path;

securing the resource of the standby path; and issuing a switch changeover message by the other extreme point node to set the switch of each node on the route of the standby path according to the secured resource.

10. The path fault recovery method according to claim 9, wherein when the fault notification is received on detection of a plurality of faults, an order of recovery is determined by a predetermined priority order of the paths to be recovered.

11. The path fault recovery method according to claim 10, wherein the predetermined priority order of the paths to be recovered from faults is a priority order of a fault recovery method.

12. The path fault recovery method according to claim 10, wherein the predetermined priority order of the paths to be recovered from faults is hop lengths of the paths to be recovered.

13. The path fault recovery method according to claim 9, wherein the node for starting a fault recovery operation is the second extreme point node having received the fault notification, and the node for starting setting of the switch of each node on the route of the standby path is the first extreme point node having completed release of the extra traffic.

14. The path fault recovery method according to claim 9, wherein the node for starting a fault recovery operation is the first extreme point node having received the fault notification, and the node for starting setting of the switch of each node on the route of the standby path is the second extreme point node of a path having completed release of the extra traffic.

15. The path fault recovery method according to claim 9, wherein the nodes for starting a fault recovery operation are the first extreme point node and the second extreme point node having received the fault notification, and the node for starting setting of the switch is one of middle nodes of the standby path having completed securing of the resource of the standby path.

16. A node using a path fault recovery method in which the node is a first extreme point node of an active path having received notification of a fault on the active path and issues a resource securing request message transferred hop by hop via at least one standby node to a second extreme point node along the route of a predetermined standby path, the node comprising:

means for releasing extra traffic in response to receipt of the resource securing request message, wherein the extra traffic is communicated traffic which is supposed to be removed from the at least one standby node of the standby path, and the resource securing request message is delivered only to specific nodes on the standby path which are required to release the extra traffic, wherein the specific nodes on the standby path are urged to release the extra traffic in response thereto, means for securing a resource reserved for the standby path after releasing the extra traffic, and means for setting a switch according to the secured resource in response to receipt of a switch changeover request message issued by the second extreme point node after securing the resource.

* * * * *